United States Patent
Bakshi et al.

(10) Patent No.: US 12,339,960 B2
(45) Date of Patent: Jun. 24, 2025

(54) DYNAMIC WORKFLOW ENGINE IN AN ENTERPRISE BOT HUB SYSTEM

(71) Applicant: Bank of America Corporation, Charlotte, NC (US)

(72) Inventors: Sakshi Bakshi, New Delhi (IN); Sudhakar Balu, Chennai (IN); Siva Paini, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 234 days.

(21) Appl. No.: 18/144,396

(22) Filed: May 8, 2023

(65) Prior Publication Data
US 2024/0378286 A1   Nov. 14, 2024

(51) Int. Cl.
  *G06F 9/48*   (2006.01)
  *G06F 21/55*   (2013.01)
  *G06N 20/00*   (2019.01)

(52) U.S. Cl.
  CPC ............ *G06F 21/554* (2013.01); *G06F 9/485* (2013.01); *G06N 20/00* (2019.01); *G06F 2221/034* (2013.01)

(58) Field of Classification Search
  CPC .. G06F 9/485; G06F 21/554; G06F 2221/034; G06N 20/00
  See application file for complete search history.

(56) References Cited

U.S. PATENT DOCUMENTS

| | | | |
|---|---|---|---|
| 8,745,731 B2 | 6/2014 | Achan et al. | |
| 8,892,446 B2 * | 11/2014 | Cheyer | G06N 5/041 704/251 |
| 9,832,227 B2 | 11/2017 | Bhargava et al. | |
| 10,200,384 B1 | 2/2019 | Mushtaq et al. | |
| 10,572,872 B2 | 2/2020 | Coburn et al. | |
| 10,587,636 B1 * | 3/2020 | Aziz | H04L 63/145 |
| 11,017,780 B2 * | 5/2021 | Steelberg | G06F 40/30 |
| 11,429,433 B2 | 8/2022 | Ramamurthy et al. | |
| 11,627,147 B2 * | 4/2023 | Lotia | H04L 63/1425 726/23 |
| 2015/0156212 A1 * | 6/2015 | Khatri | H04L 63/1425 726/23 |
| 2016/0342903 A1 * | 11/2016 | Shumpert | G06F 11/008 |
| 2019/0122258 A1 | 4/2019 | Bramberger et al. | |

(Continued)

OTHER PUBLICATIONS

Livingood et al., Mar. 2012, Recommendations for the Remediation of Bots in ISPNetworks, Internet Engineering Task Force (IETF), Request for Comments:6561 (Year:2012).*

*Primary Examiner* — Mohammad A Siddiqi
(74) *Attorney, Agent, or Firm* — Banner & Witcoff, Ltd.

(57) ABSTRACT

Aspects of the disclosure relate to monitoring, evaluating, and repairing bots in a hashchain-based distributed bot hub that process a workflow. In some embodiments, a computing platform may receive workflow information associated with performing a first workflow that includes executing one or more tasks using a plurality of virtual bots, instantiate a first subset of the plurality of bots to process the one or more tasks of the first workflow, and instantiate a first subset of the plurality of bots to process the one or more tasks of the first workflow. identifying a potential anomalous activity may include causing the monitor bot hub to remove the identified bot to a quarantine hub, and execute a repair process on the identified bot in the quarantine hub.

20 Claims, 17 Drawing Sheets

(56) References Cited

U.S. PATENT DOCUMENTS

| | | |
|---|---|---|
| 2021/0090076 A1 | 3/2021 | Wright et al. |
| 2023/0107233 A1* | 4/2023 | Ripa ........................ G06F 8/34 700/29 |
| 2024/0378067 A1* | 11/2024 | Bakshi ...................... H04L 9/50 |
| 2024/0378078 A1* | 11/2024 | Bakshi ................ G06F 11/3409 |

\* cited by examiner

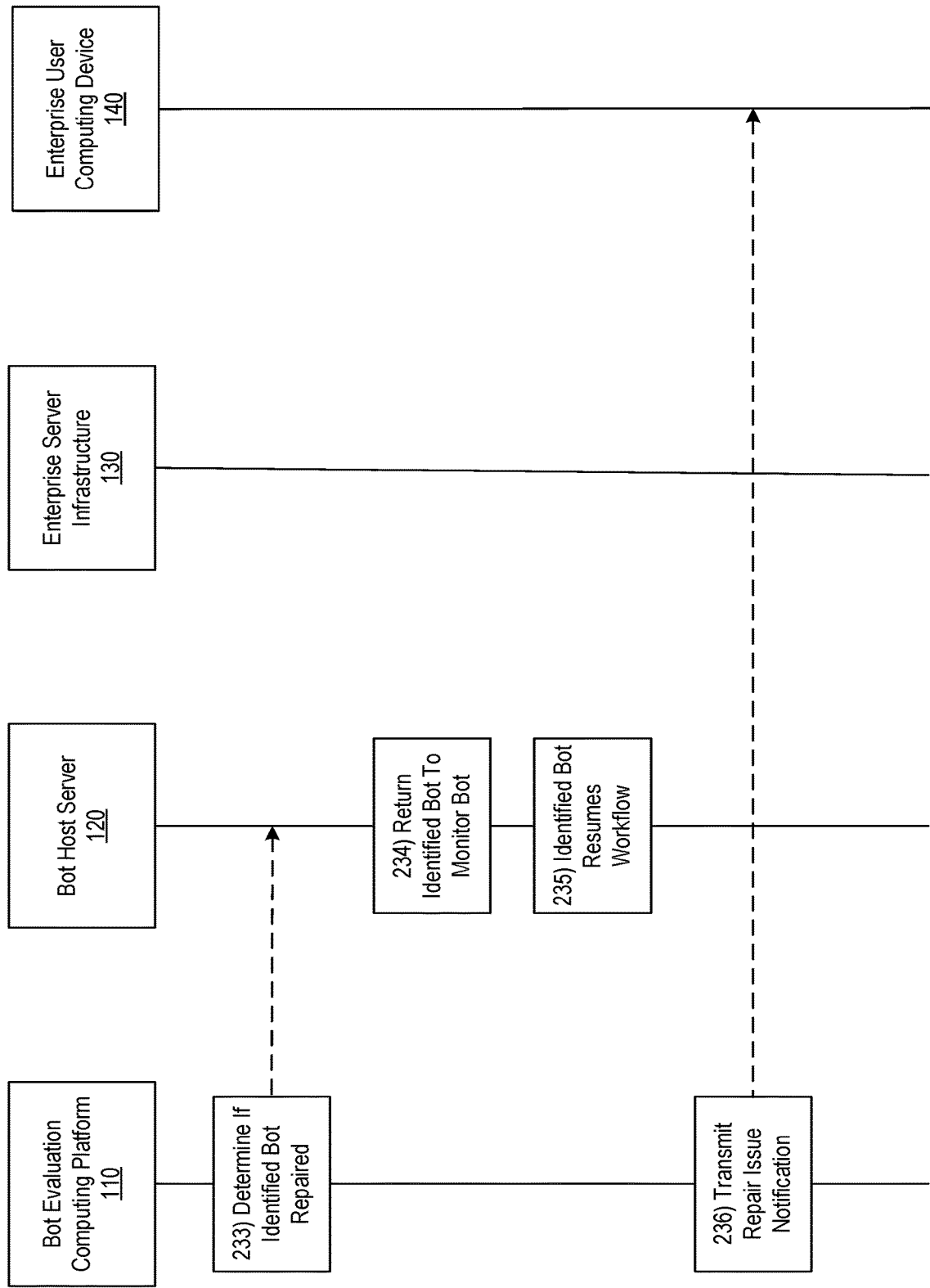

DYNAMIC WORKFLOW ENGINE IN AN ENTERPRISE BOT HUB SYSTEM

BACKGROUND

Aspects of the disclosure relate to computer systems and networks. In particular, one or more aspects of the disclosure relate to monitoring, evaluating, and repairing virtual bots in a hashchain-based distributed bot hub that process one or more tasks in a workflow queue.

As computer systems are increasingly used to provide automated and electronic services, such computer systems may obtain and maintain increasing amounts of various types of sensitive information. Ensuring the safety and security of such information may thus be increasingly important. In many instances, however, it may be difficult to maintain efficient and effective technical operations of the computer systems that process such information and/or provide such automated and electronic services, particularly when also attempting to optimize the resource utilization, bandwidth utilization, and efficient operations of the enterprise computing infrastructure.

SUMMARY

Aspects of the disclosure provide effective, efficient, scalable, and convenient technical solutions that address and overcome the technical problems associated with optimizing the efficient and effective technical operations of computer systems. In particular, one or more aspects of the disclosure provide techniques for monitoring, evaluating, and repairing virtual bots in a hashchain-based distributed bot hub that process one or more tasks in a workflow queue.

In accordance with one or more embodiments, a computing platform having at least one processor, a communication interface, and memory may receive, via the communication interface, workflow information associated with performing a first workflow that includes executing one or more tasks using a plurality of virtual bots. The computing platform may then process the workflow information to identify a plurality of bots associated with processing the first workflow, compute, using a hash function, a hashchain for each identified bot of the plurality of bots, wherein the hashchain includes a trackable code specific to an associated bot, and transmit a workflow start instruction to a bot orchestrator on a virtual bot host server. Transmitting the workflow start instruction to the bot orchestrator may cause the bot orchestrator to instantiate the plurality of bots to process the one or more tasks of the first workflow. Subsequently, the computing platform may monitor the plurality of bots performing the one or more tasks of the first workflow. Monitoring the plurality of bots may include verifying tasks of identified bots based on analyzing hashchains of bots performing tasks of the first workflow. The computing platform may thereafter, based on monitoring the plurality of bots, identify a potential anomalous activity by at least one bot.

In some embodiments, the computing platform may receive a workflow security policy associated with an enterprise organization. Processing the workflow information may then include verifying the workflow information with the workflow security policy. In some examples, computing the hashchain for each identified bot of the plurality of bots may include assigning an identification code for the associated bot and a task code associated with at least one task to be executed by the associated bot. In some examples computing the hashchain for each identified bot of the plurality of bots may include evaluating the one or more tasks of the first workflow and assigning bot with an identifier in accordance with the one or more tasks. In some examples, computing the hashchain for each identified bot of the plurality of bots may include determining a relative permanence of a task of the one or more tasks of the first workflow and attributing a portion of the hashchain based on the relative permanence of the task.

In some embodiments, transmitting the workflow start instruction to the bot orchestrator on the virtual bot server may further cause the virtual bot server to distribute the one or more tasks of the first workflow to the plurality of bots in accordance with associated hashchains of each of the plurality of bots. In some examples, transmitting the workflow start instruction to the bot orchestrator on the virtual bot server may further cause the virtual bot server to form a plurality of bot hubs, and each bot hub may include one or more bots of the plurality of bots. The plurality of bot hubs may then be formed by matching workflow keys from the workflow information to portions of hashchains of the plurality of bots. In some examples, monitoring the plurality of bots may include analyzing a ledger associated with a respective bot of each of the plurality of bots. The ledger may include metadata of the respective bot and of other bots performing a common task of the first workflow.

In some embodiments, the computing platform may receive a notification that the computed hashchains are specific to a first session. Subsequently, the computing platform may then scrub hashchains and related ledgers from each of the plurality of bots upon completing the first session. In some examples, analyzing the ledger may include at least one of: analyzing metadata relative to the workflow information or metadata of neighboring bots associated with the same task, or comparing a ledger entry to an expected ledger entry. The expected ledger entry may be based on the workflow information. In some examples, the computing platform may train a machine learning model to verify non-anomalous bot interactions based on tracked workflow information from monitoring one or more previous workflows.

In some embodiments, the computing platform may, upon identifying the potential anomalous activity by at least one bot, initiate a quarantine process on the at least one bot. The quarantine process may include removing the at least one bot from the first workflow, transmitting a notification to an enterprise computing device providing a security risk notification associated with the potential anomalous activity, and transmitting an alert to other bots in a common bot hub as the at least one bot. In some examples, the computing platform may receive, via the communication interface, a notification to stop the first workflow; determine a workflow stop procedure for the first workflow, perform the workflow stop procedure, and upon completing the workflow stop procedure, transmit a notification to an enterprise computing device indicating the workflow stop procedure has been completed. In some examples, the computing platform may, upon stopping the first workflow, determine if computed hashchains are session specific, and scrub the computed hashchains and associated ledgers from bots associated with performing the first workflow if computed hashchains are session specific.

In accordance with one or more embodiments, a method at a computing platform having at least one processor, a communication interface, and memory may include receiving, via the communication interface, workflow information associated with performing a first workflow that includes executing one or more tasks using a plurality of virtual bots, identifying a plurality of bots associated with processing the first workflow, and computing, using a hash function, a hashchain for each identified bot of the plurality of bots, wherein the hashchain includes a trackable code specific to an associated bot. The method may thereafter include transmitting a workflow start instruction to a bot orchestrator on a virtual bot host server. Transmitting the workflow start instruction to the bot orchestrator may then cause the bot orchestrator to instantiate the plurality of bots to process the one or more tasks of the first workflow. Subsequently, the method may include monitoring the plurality of bots performing the one or more tasks of the first workflow. Monitoring the plurality of bots may include verifying tasks of identified bots based on analyzing hashchains of bots performing tasks of the first workflow to identify a potential anomalous activity by at least one bot.

In some embodiments, computing the hashchain for each identified bot of the plurality of bots may include assigning an identification code for the associated bot and a task code associated with at least one task to be executed by the associated bot. In some examples, computing the hashchain for each identified bot of the plurality of bots may include determining a relative permanence of a task of the one or more tasks of the first workflow and attributing a portion of the hashchain based on the relative permanence of the task.

In some embodiments, transmitting the workflow start instruction to the bot orchestrator on the virtual bot server may further cause the virtual bot server to distribute the one or more tasks of the first workflow to the plurality of bots in accordance with associated hashchains of each of the plurality of bots. In some examples, monitoring the plurality of bots may include analyzing a ledger associated with a respective bot of each of the plurality of bots. The ledger may include metadata of the respective bot and of other bots performing a common task of the first workflow.

In accordance with one or more embodiments, one or more non-transitory computer-readable media storing instructions that, when executed by a computing platform comprising at least one processor, a communication interface, and memory, may cause the computing platform to receive, via the communication interface, workflow information associated with performing a first workflow that includes executing one or more tasks using a plurality of virtual bots, identify a plurality of bots associated with processing the first workflow, compute, using a hash function, a hashchain for each identified bot of the plurality of bots, wherein the hashchain includes a trackable code specific to an associated bot, transmit a workflow start instruction to a bot orchestrator on a virtual bot host server, wherein transmitting the workflow start instruction to the bot orchestrator causes the bot orchestrator to instantiate the plurality of bots to process the one or more tasks of the first workflow, monitor the plurality of bots performing the one or more tasks of the first workflow, wherein monitoring the plurality of bots includes: verifying tasks of identified bots based on analyzing hashchains of bots performing tasks of the first workflow; and analyzing ledgers of identified bots that track metadata of a respective bot and of other bots performing a common task of the first workflow, and based on monitoring the plurality of bots, identify a potential anomalous activity by at least one bot.

In accordance with one or more embodiments, a computing platform having at least one processor, a communication interface, and memory may receive, via the communication interface, a workflow process instruction from an enterprise computing device. The workflow process instruction may include workflow information associated with performing a first workflow process by executing one or more tasks using a plurality of virtual bots. The computing platform may then process the workflow information to identify a plurality of bots associated with performing the first workflow process, and determine, using a machine learning model, an arrangement of bot hubs to execute one or more tasks of the first workflow process. Each bot hub may include at least one bot and bots within a common bot hub may share metadata while executing one or more tasks of the first workflow process. Thereafter, the computing platform may send the determined arrangement of bot hubs to a bot orchestrator on a virtual bot host server. Sending the determined arrangement of bot hubs to the bot orchestrator may cause the bot orchestrator to instantiate at least one bot corresponding to the determined number of bots to form the determined arrangement of bot hubs and to process tasks from the first workflow using the at least one bot.

In some embodiments, determining the arrangement of bot hubs may include arranging a monitor bot hub that includes a closed network of monitor bots configured to observe other bot hubs and to store metadata associated with observing other bot hubs. In some examples, the computing platform may remove the identified bot to a quarantine hub based on an observation that an identified bot in another bot hub exhibits abnormal behavior, and execute a repair process on the identified bot in the quarantine hub. In some examples, the computing platform may issue a monitor bot from the monitor bot hub to replace the identified bot in the other bot hub while the identified bot remains in the quarantine hub. In some examples, the computing platform may, upon removing the identified bot to the quarantine hub, send a quarantined bot identification to an enterprise computing device. Sending the quarantined bot identification may cause the enterprise computing device to display one or more graphical user interfaces providing information associated with the first workflow and the identified bot in the quarantine hub.

In some embodiments, determining the arrangement of bot hubs may include matching workflow keys of bots in the plurality of bots to form an associated bot hub. In some examples, determining the arrangement of bot hubs may include computing, using a hash function, a hashchain for each identified bot of the plurality of bots, and determining a subset of bots for an associated bot hub by matching components of hashchains associated with one or more tasks of the first workflow. The hashchain may include a trackable code specific to an associated bot and associated with one or more tasks of the first workflow. In some examples, processing the workflow information to identify the plurality of bots may include training, by the at least one processor, the machine learning model based on robotic process automation using workflow process instruction and historical workflow data. In some examples, processing the workflow information to identify the plurality of bots may include determining, using the machine learning model, an optimal number of bots to process the first workflow.

In some embodiments, determining the arrangement of bot hubs may include aligning one or more bots of the plurality of bots based common tasks of the first workflow. In some examples, the computing platform may, upon completing the first workflow, determine if the machine learning model is to be updated based on comparing one or more computing metrics associated with completion of the first workflow to one or more computing metrics from historical workflow data, and retrain the machine learning model to identify an arrangement of bot hubs to complete a workflow based on the comparing.

In accordance with one or more embodiments, a method at a computing platform having at least one processor, a communication interface, and memory may include receiving, via the communication interface, a workflow process instruction from an enterprise computing device. The workflow process instruction may include workflow information associated with performing a first workflow process by executing one or more tasks using a plurality of virtual bots. The method may then include identifying a plurality of bots associated with performing the first workflow process, and determining, using a machine learning model, an arrangement of bot hubs to execute one or more tasks of the first workflow process. Each bot hub may include at least one bot and bots within a common bot hub may share metadata while executing one or more tasks of the first workflow process. Thereafter, the method may include sending the determined arrangement of bot hubs to a bot orchestrator on a virtual bot host server. Sending the determined arrangement of bot hubs to the bot orchestrator may cause the bot orchestrator to instantiate at least one bot corresponding to the determined number of bots to form the determined arrangement of bot hubs and to process tasks from the first workflow using the at least one bot.

In some embodiments, determining the arrangement of bot hubs may include arranging a monitor bot hub that includes a closed network of monitor bots configured to observe other bot hubs and to store metadata associated with observing other bot hubs. In some examples, the method may include, based on an observation that an identified bot in a first bot hub exhibits abnormal behavior, removing the identified bot to a quarantine hub, and executing a repair process on the identified bot in the quarantine hub. In some examples, the method may further include issuing a monitor bot from the monitor bot hub to replace the identified bot in the first bot hub while the identified bot remains in the quarantine hub.

In some embodiments, determining the arrangement of bot hubs may include matching workflow keys of bots in the plurality of bots to form an associated bot hub. In some examples, determining the arrangement of bot hubs may include computing, using a hash function, a hashchain for each identified bot of the plurality of bots, and determining a subset of bots for an associated bot hub by matching components of hashchains associated with one or more tasks of the first workflow. The hashchain may include a trackable code specific to an associated bot and associated with one or more tasks of the first workflow. In some embodiments, determining the arrangement of bot hubs may include aligning one or more bots of the plurality of bots based common tasks of the first workflow.

In some embodiments, the method may include, upon completing the first workflow, determining if the machine learning model is to be updated based on comparing one or more computing metrics associated with completion of the first workflow to one or more computing metrics from historical workflow data, and retraining the machine learning model to identify an arrangement of bot hubs to complete a workflow based on the comparing.

In accordance with one or more embodiments, one or more non-transitory computer-readable media storing instructions that, when executed by a computing platform comprising at least one processor, a communication interface, and memory, may cause the computing platform to receive, via the communication interface, a workflow process instruction from an enterprise computing device, the workflow process instruction including workflow information associated with performing a first workflow process by executing one or more tasks using a plurality of virtual bots, identify a plurality of bots associated with performing the first workflow process, determine, using a machine learning model, an arrangement of bot hubs to execute one or more tasks of the first workflow process, wherein each bot hub includes at least one bot and wherein bots within a common bot hub share metadata while executing one or more tasks of the first workflow process, and wherein the arrangement of bot hubs includes a monitor bot hub that includes a closed network of monitor bots configured to observe other bot hubs and to store metadata associated with observing other bot hubs, and send the determined arrangement of bot hubs to a bot orchestrator on a virtual bot host server, wherein sending the determined arrangement of bot hubs to the bot orchestrator causes the bot orchestrator to instantiate at least one bot corresponding to the determined number of bots to form the determined arrangement of bot hubs and to process tasks from the first workflow using the at least one bot.

In accordance with one or more embodiments, a computing platform having at least one processor, a communication interface, and memory may receive, via the communication interface and from an enterprise computing device, workflow information associated with performing a first workflow process by executing one or more tasks using a plurality of virtual bots, and transmit a workflow start instruction to a bot orchestrator on a virtual bot host server. Transmitting the workflow process start instruction to the bot orchestrator may cause the bot orchestrator to instantiate a first subset of the plurality of bots to process the one or more tasks of the first workflow. The computing platform may thereafter transmit a monitor instruction to the bot orchestrator on the virtual bot host server. Transmitting the monitor instruction to the bot orchestrator may cause the bot orchestrator to instantiate a second subset of the plurality of bots to form a monitor bot hub that monitors the first subset of bots performing the one or more tasks of the first workflow to identify a potential anomalous activity by at least one bot. Identifying a potential anomalous activity by an identified bot may cause the monitor bot hub to remove the identified bot to a quarantine hub, and execute a repair process on the identified bot in the quarantine hub.

In some embodiments, the computing platform may issue a replacement bot from the monitor bot hub to replace the identified bot while the identified bot remains in the quarantine hub. The replacement bot may resume the workflow assigned to the identified bot at a first workflow point where the identified bot stopped prior to being removed to the quarantine hub. In some examples, the computing platform may receive an indication that the repair process has successfully repaired the identified bot, transfer the identified bot to a bot hub position to resume the workflow assigned to the identified bot at a second workflow point where the replacement bot left off, and transfer the replacement bot back to the monitor bot hub. In some examples, the computing platform may store, to a repair process database, repair execution details relating to the repair process on the identified bot, and train a machine learning model to identify anomalous behavior in a second workflow based on stored repair execution details.

In some embodiments, the computing platform may transmit, to the enterprise computing device, a notification indicating that the identified bot has been placed in the quarantine hub for the repair process and may provide a status of the quarantine process. In some examples, executing the repair process may further cause additional network repair processes over a network of the virtual bot host server process. In some examples, instantiating the first subset of bots to process the one or more tasks of the first workflow may include arranging the first subset of bots in one or more bot hubs by aligning one or more bots based common tasks of the first workflow. In some examples, transmitting the workflow start instruction to the bot orchestrator may include computing, using a hash function, a hashchain for each identified bot of the first subset of bots, and identifying the potential anomalous activity by at least one bot may include monitoring hashchain ledgers of each of the first subset of bots. The hashchain may include a trackable code specific to an associated bot and associated with one or more tasks of the first workflow.

In some embodiments, identifying the potential anomalous activity by at least one bot may include training, by the at least one processor, a machine learning model to identify potential anomalous activity based on tracking hashchain ledgers of the plurality of bots and expected workflow from received workflow information. In some examples, identifying the potential anomalous activity by at least one bot may include analyzing, by the monitor bot hub, metadata of bots in the plurality of bots. In some examples, identifying the potential anomalous activity by at least one bot may include training, by the at least one processor, a machine learning model based on data related to a completed repair process and identified anomalous activity.

In some embodiments, the computing platform may receive an indication that the repair process has successfully repaired the identified bot, and transmit a notification to an enterprise user device providing a repair analysis of the identified bot.

In accordance with one or more embodiments, a method at a computing platform having at least one processor, a communication interface, and memory may include receiving, via the communication interface and from an enterprise computing device, a workflow information associated with performing a first workflow process by executing one or more tasks using a plurality of virtual bots, and transmitting a workflow start instruction to a bot orchestrator on a virtual bot host server. Transmitting the workflow process start instruction to the bot orchestrator may cause the bot orchestrator to instantiate a first subset of bots of the plurality of bots to process the one or more tasks of the first workflow. The method may then include transmitting a monitor instruction to a bot orchestrator on a virtual bot host server. Transmitting the monitor instruction to the bot orchestrator may cause the bot orchestrator to instantiate a second subset of bots of the plurality of bots to form a monitor bot hub. The monitor bot hub may be configured to monitor the first subset of bots performing the one or more tasks of the first workflow, identify a potential anomalous activity by at least one bot in the first subset of bots, remove the identified bot to a quarantine hub, and execute a repair process on the identified bot in the quarantine hub.

In some embodiments, the method may include issuing a replacement bot from the monitor bot hub to replace the identified bot while the identified bot remains in the quarantine hub. The replacement bot may resume the workflow assigned to the identified bot at a first workflow point where the identified bot stopped prior to being removed to the quarantine hub. In some examples, the method may further include receiving an indication that the repair process has successfully repaired the identified bot, transferring the identified bot to a bot hub position to resume the workflow assigned to the identified bot at a second workflow point where the replacement bot left off, and transferring the replacement bot back to the monitor bot hub.

In some embodiments, identifying the potential anomalous activity by at least one bot may include training, by the at least one processor, a machine learning model to identify potential anomalous activity based on tracking hashchain ledgers of the plurality of bots and expected workflow from received workflow information. In some examples, identifying the potential anomalous activity by at least one bot may include analyzing, by the monitor bot hub, metadata of bots in the plurality of bots.

In some embodiments, the method may include receiving an indication that the repair process has successfully repaired the identified bot, and transmitting a notification to an enterprise user device providing a repair analysis of the identified bot. In some examples, identifying the potential anomalous activity by at least one bot may include training, by the at least one processor, a machine learning model based on data related to a completed repair process and identified anomalous activity.

In accordance with one or more embodiments, one or more non-transitory computer-readable media storing instructions that, when executed by a computing platform comprising at least one processor, a communication interface, and memory, may cause the computing platform to receive, via the communication interface and from an enterprise computing device, workflow information associated with performing a first workflow process by executing one or more tasks using a plurality of virtual bots, determine, using a machine learning model, a first subset of the plurality of bots to process the one or more tasks of the first workflow and a second subset of the plurality of bots to monitor the first subset of bots performing the one or more tasks of the first workflow, transmit a workflow start instruction to a bot orchestrator on a virtual bot host server, wherein transmitting the workflow process start instruction to the bot orchestrator causes the bot orchestrator to instantiate the first subset of bots to process the one or more tasks of the first workflow, and transmit a monitor instruction to the bot orchestrator on the virtual bot host server, wherein transmitting the monitor instruction to the bot orchestrator causes the bot orchestrator to instantiate the second subset of bots to form a monitor bot hub configured to: monitor the first subset of bots performing the one or more tasks of the first workflow, based on the monitoring, identify a potential anomalous activity by at least one bot, remove the identified bot to a quarantine hub, and execute a repair process on the identified bot in the quarantine hub.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for monitoring, evaluating, and repairing virtual bots in a hashchain-based distributed bot hub that process one or more tasks in a workflow queue in accordance with one or more example embodiments;

DETAILED DESCRIPTION

Figure 1A:
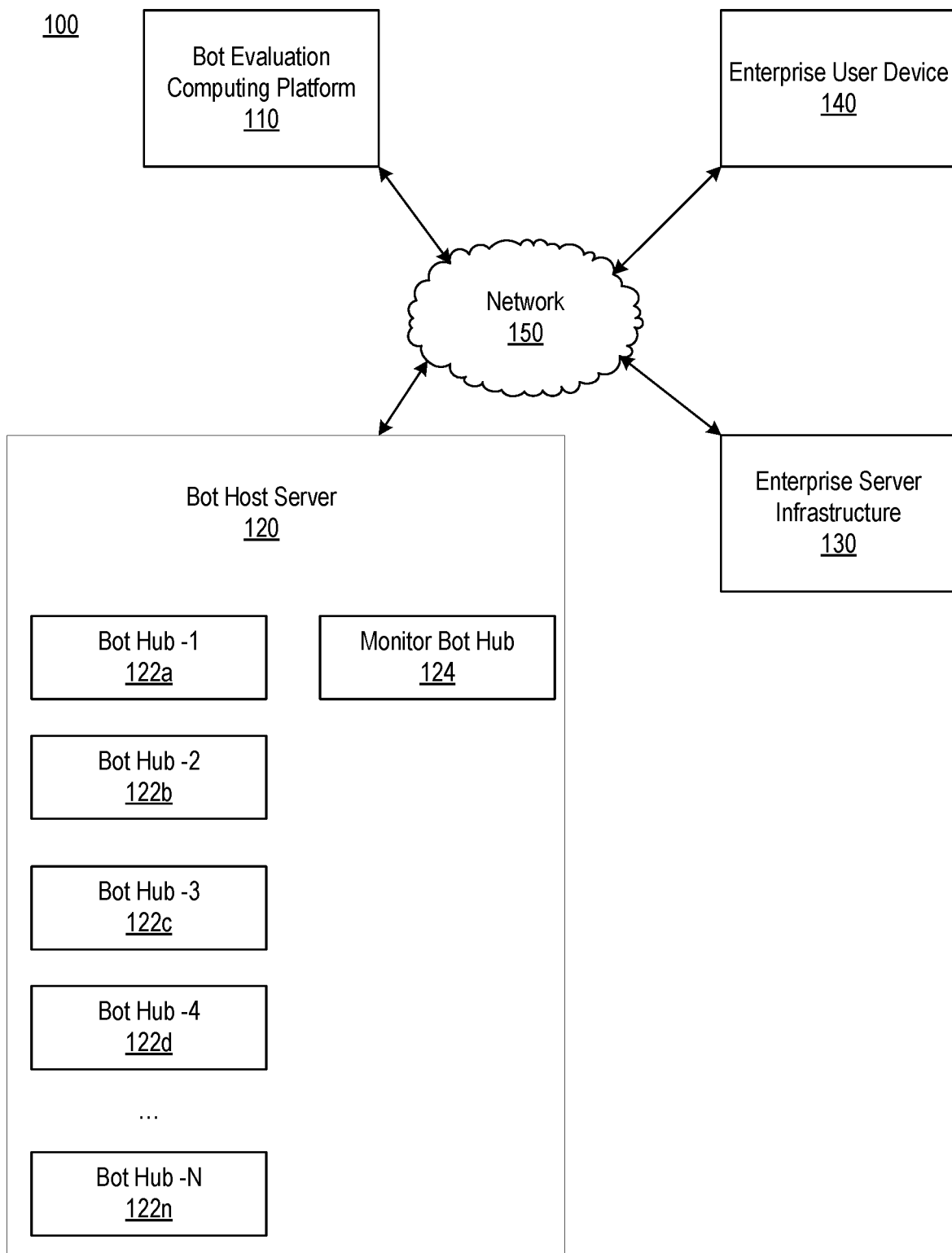
FIGS. 1A and 1B depict an illustrative computing environment for monitoring, evaluating, and repairing virtual bots in a hashchain-based distributed bot hub that process one or more tasks in a workflow queue in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. As a brief introduction to the concepts described further herein, one or more aspects of the disclosure provide systems and methods to efficiently and effectively implement artificial intelligence engines for monitoring, evaluating, and repairing bots in a hashchain-based distributed bot hub that process one or more tasks in a workflow queue. For example, one or more of the systems and methods described herein are directed towards monitoring, evaluating, and repairing virtual bots in a hashchain-based distributed bot hub that process one or more tasks in a workflow queue. In one or more instances, virtual bots may be monitored using hashchain ledgers and potentially suspicious activity may be identified based on identified variations in the hashchain ledgers. In one or more instances, a bot hub architecture may be formed that includes a plurality of enterprise bot hubs and a monitoring bot hub that monitors the enterprise bot hubs and initiates a repair process upon identifying a virtual bot exhibiting potentially abnormal behavior. In some instances, a virtual bot exhibiting potentially abnormal activity bot may be identified, quarantined, and repaired, and a replacement bot may be issued to fill in for the quarantined bot during a quarantine interval.

Computing systems and environments may make use of virtual bots to automate repetitive processes, e.g., involving numerous tasks or repeated transactions, and distribute workflow across multiple bots to be executed in parallel, thereby reducing manual efforts and processing times needed to execute and complete such processes. However, situations may arise where bots exhibit abnormal behavior, e.g., due to malicious or suspicious activities and/or stemming from cyberattacks, external malfunctioning bots, or network/system issues. Such situations may impact workflow tasks assigned to that bot. Indeed, one impacted bot may trigger incorrect workflow execution in other instances and/or across other bots in the computing infrastructure. Current systems lack a simplified way to alert or communicate abnormal activity details to other bots in such scenarios, or to protect or authenticate bots performing multiple tasks or transactions in parallel.

In order to solve for the above-noted shortcomings, a computing platform may be configured to self-evaluate and self-heal bots in a distributed bot hub architecture. Specifically, systems, methods, and apparatuses described herein may provide an intelligent apparatus that uses hashchain tracking and a distributed bot hub architecture to autonomously monitor and repair bots, thereby reducing or even eliminating impact to the system due to abnormal or malfunctioning bots. As described herein, a self-evaluating bot hub system may include a system of hubs and bots within each of the hubs, and the bots may share and store metadata and workflow execution information in a distributed electronic ledger ecosystem for self and cross checks of the bots. As part of the monitoring and analyzing processes, bots may be assigned with incremental identifiers based on the tasks to be performed. The identifiers may be composed of hashed keys, and may be generated from an artificial intelligence engine that evaluates the relative permanence of tasks and segregates identifiers as fixed identifiers or session-based identifiers. The hashed key identifiers may be tracked in hash chain ledgers associated with one or more of the bots. Based on a hashchain match, respective bots may form a cross chain and share metadata in the hashchain ledgers. Upon identifying a deviation in processing or behavior of a particular bot, ledgers from other bots in the chain may subsequently flag the suspicious or abnormal bot behavior and the bot is then quarantined from the chain. The bot hub system may include a monitoring bot hub that evaluates quarantined bots and cross examines overall bot hashchain to ensure no interruption to the workflow of the system occurs as part of the bot quarantine and repair process. Suspicious or abnormal bot metadata may be shared with other bot hubs as part of mitigating similar issues that may potentially arise in those bot hubs if similar parameters match with those of the suspicious or abnormal bot metadata.

Accordingly, systems, methods, and apparatuses described herein may employ a plurality of distributed bot hubs to self-evaluate and self-heal bots within the distributed bot hubs to reduce or eliminate downtime in the bot system. The bot hubs may be setup based on task alignment of the bots in the workflow according to hash key matches. Each bot may have a ledger that updates, monitors, and evaluates metadata of that bot as well as the neighboring bots. The bots may thus be configured to self-verify their activity as well as the activity of other bots in the hub, and the bot ledgers may be used by an artificial intelligence/machine learning engine in the network to dynamically and intelligently identify suspicious or abnormal bot activity. A bot that has been identified as having suspicious or abnormal actional may be removed and quarantined from the chain and a monitoring bot may take over the quarantined bot's activity until the bot has been repaired and placed back in the bot hub.

Bot hub systems as described herein provide a setup in which bots within the network may collaborate and cross-evaluate and self-evaluate and in which tasks may be completed without disruption to workflow, even where a bot has been identified as potentially compromised and in need of repair. The bots may share the distributed ledgers within the network as part of evaluating ledgers and identifying any deviations from expected behavior and may alert other bots in the network for the mitigation of similar deviations. A cognitive artificial engine and dynamic workflow engine may ensure that expected bot workflows are classified as such and shared, and may create hash keys to group bots for evaluation. Generated hash keys may be permanent or session specific. Session specific hash keys may help ensure that ledgers are cleaned up once a workflow session is over and a bot can be reprocessed for a next session. A monitoring bot chain may include a closed network of bots that monitors all other bot hubs, and stores relevant metadata to take over a quarantined bot hub as needed. The monitoring bot network may also work as a second gateway to evaluate quarantined bots and to improve the preventative capabilities of the system to identify suspicious or abnormal bot activity.

A self-healing engine of the bot hub may be used to identify discrepancies in the bot ledgers, quarantine and repair a bot associated with the discrepancy, and replace that bot back into the hub upon completion of the repair. A smart workflow switch engine may enable a monitor bot to take over the quarantined bot's activity and workflow to continue an incomplete task without any lag or downtime. An artificial intelligence engine may continuously monitor the bot hub system for any abnormal behavior of any bot in any of the bot hubs, including the monitor hub. A logging mechanism within the artificial intelligence engine may track any abnormal events in order to continue to train the system to identify suspicious or abnormal bot activity and to provide real time mitigation of suspicious or abnormal bot activity in the bot hub system. The artificial intelligence engine may also store previous session history for use by the monitor bot chain to identify deviations in regular bot activity based on comparison to previous session data.

Certain systems, methods, and apparatuses described herein may include a distributed bot hub system that includes a plurality of bot hubs, each of the bot hubs including a plurality of bots. Each of the bot hubs may share metadata through distributed ledgers. Each ledger may contain metadata for a specific bot as well as at least partial metadata for neighboring bots for evaluation of bots in the bot hub. In particular, each of the bots in a hub may cross verify ledgers of other bots in the hub periodically. Based on detecting or identifying a deviation from an expected ledger entry in any bot, the suspected bot may be quarantined so as to preserve and not corrupt the overall workflow within the bot hub. The bot hub system may further include a monitor hub system that may include one or more monitor bots. The monitor bot hub may also evaluate ledgers in one or more of the bot hubs may evaluate and detect abnormal bot behavior and make take one or more preventative mechanisms on a bot hub upon detecting abnormal bot behavior. For example, the monitor bot hub may determine whether a bot in a bot hub exhibits abnormal behavior, quarantine that bot, and diagnose an issue with that bot. Upon a bot with abnormal behavior being placed in quarantine, the monitor bot hub may issue a monitor bot to be placed in the bot hub from which the bot exhibiting abnormal behavior has been quarantined, and the monitor bot then takes over the workflow of that quarantined bot, so as to complete workflow within that bot hub without disruption. The monitor bot hub may then observe and cross check evaluations of bots in the plurality of bot hubs. The monitor bot hub may also act as a gateway between quarantined bots and their associated bot hubs. An artificial intelligence cognitive engine may include a cognitive hash key generator and cognitive validator for use in evaluated bots in the bot hub system. Based on the workflow execution process, the cognitive engine may generate hash keys to form the bot hubs. The cognitive engine may also evaluate metadata of the distributed bots in the plurality of bot hubs as part of identifying suspicious or abnormal bot behavior in the bot hub system.

A process flow in accordance with the systems, methods, and apparatuses described herein may include a number of steps performed by a cognitive AI engine and/or one or more other computing devices in a distributed hot hub system. The cognitive AI engine may first receive bot schedules and workflow distribution details from a bot server. In some examples, the cognitive AI engine may first be triggered and, subsequently, the cognitive AI engine may extract bot schedule details. Upon determining that bot workflow executions exist, e.g., based on checking that a bot execution count is greater than zero, then the cognitive AI engine may trigger a hash key generator to generate hash keys for bots in the distributed bot hub system. The generated hash keys may form unique identifiers for each of the bots in a given workflow process. In some examples, generating hash keys may include scrubbing existing identifiers or hash keys. Otherwise, the cognitive AI engine may stop, e.g., until bot workflow execution instructions have been received.

The cognitive AI engine may include a cognitive AI validator and workflow distributor. The cognitive AI validator may form a plurality of bot hubs based on matching workflow keys of a plurality of bots. Each bot may have a ledger for tracking, updating, and evaluating metadata of that bot. The ledgers may also contain metadata for its specific bot and as well as metadata for neighboring bots and/or other bots in the bot hub. Each of the plurality of bot hubs may thus act as hash chains and may evaluate and verify activity in the bot hub. The ledgers may also receive expected bot behaviors entries from the cognitive AI engine and/or a monitor bot hub as part of identifying suspicious or abnormal bot behavior in the bot hub.

The cognitive AI engine may determine if abnormal or suspicious activity is present in a particular bot or bot hub. If no abnormal or suspicious activity has been detected, the cognitive AI engine may extract bot hub execution details and workflow information for storing in a database and for future use in training the validator to validate ongoing bot workflows and to detect abnormal bot behavior. If abnormal or suspicious activity has been detected, the cognitive AI engine may trigger the suspicious bot or bots for quarantine from the bot hub. In some instances, a plurality of bots in the bot hub system may be simultaneously quarantined. The suspicious bot metadata may be shared with other bot hubs to prevent similar situations from occurring without detection, e.g., based on metadata matches to the suspicious bot metadata. While a bot is quarantined, the monitor bot hub may issue a monitor bot to take over quarantined bot activities. The monitor bot hub may then be injected to the relevant bot hub and may execute the workflow from the point where the process was stopped before quarantining the bot. If the workflow process is currently incomplete, the monitor bot may continue with the existing workflow execution. Otherwise, the monitor bot hub may begin execution of the workflow execution in conjunction with other bots of the bot hub. The cognitive AI engine may subsequently determine if the quarantined bot has been repaired. If the quarantined bot has been repaired, then a self-healing engine of the cognitive AI engine may perform one or more repair steps to the bot hub associated with the quarantined bot, such as restarting the server, rerouting memory, assigning additional resources to the bot in case of any latency or network issues, rectifying machines and/or licenses, and the like. The now-repaired bot may be replaced in the bot hub and may begin execution of the workflow process, while the monitor bot may be switched back to the monitor bot hub. The validator engine may then check that the bot issue has been resolved and link to the bot hub after the issue is fixed for ongoing monitoring.

For repair processes on quarantine bots, the monitor bot hub may assist in the repair process. In some instances, the monitor bot hub may monitor all bots in the bot hub system and may evaluate and take over workflow execution from quarantined bots where the workflow processes stopped. The monitor bot hub may store monitor bot execution data along with details of a related quarantined bot. Monitor bot hub execution details and workflow data may be stored in a database of the cognitive engine for training the engine for improved ongoing validation and detection of abnormal bot behaviors in future workflows, and may include tokenization, feature engineering, encoding, and/or data packaging. Session specific hash keys may ensure that ledgers are cleaned up once the workflow session is over and the bot can be reprocessed with a clean ledger for a next workflow session.

The systems, methods, and apparatuses described herein may provide a number of benefits over existing systems. Bot hubs described herein may create an ecosystem of task completion with reduced or even eliminated down time using cross-collaboration and evaluation of bots within the distributed bot hub system. A cognitive hash key generator may create hash keys for each bot in the system and may form a plurality of bot hubs to make a distributed bot hub system. A cognitive AI validator may validate each of the bot hubs by matching identifiers, e.g., hash keys, of each of the bots with expected ledger entries. The bots in each bot hub may thus form a cross chain with each other and share metadata in the hashchain ledgers. For any deviation in the processing or behavior of a bot, the ledgers from other bots in the chain may flag suspicious bot behavior and the bot may then be quarantined from the chain. Upon an issue being fixed, the quarantined bot may be added back to the bot hub. A self-healing engine may rectify the issue associated with the quarantined bot by performing one or more repair steps, such as restarting the server, rerouting memory, assigning more resources to the newly-repaired (and previously-quarantined) bot, and the like. The monitor bot hub may observe each of the bots in the distributed bot hub system, evaluate hashchain ledgers for the detection of any abnormal or suspicious bot behavior, and take over the workflow and execution of any quarantined bot. The cognitive AI engine may get bot schedule and distribution details from a bot host server. Bot execution details may be stored in a database for future reference and comparison. In comparison, in known systems where a bot in performing abnormally, there is no mechanism to alert other bots, there is potential for a high impact on business processes and operational risks, root cause analysis must be performed manually and only after an issue has occurred, and there is potential for similar issues to occurs in other bots.

In a computing platform having at least one processor, a communication interface communicatively coupled to the at least one processor, and memory storing computer-readable instructions that, when executed by the at least one processor, cause the computing platform to perform a number of steps, as described herein.

Accordingly, by performing the one or more methods described herein, one or more technical advantages may be realized. For example, one technical advantage of systems and methods described herein is that such techniques may optimize computing resources, and may complete current workflow processes more efficiently and without downtime. This approach may allow for the completion of workflow processes in a more efficient and timely manner. Furthermore, one or more of the systems and methods described herein may improve computing resource capacity at one or more computing systems by reducing an amount of computing resources used for repairing or quarantining identified bots and the completion of a current workflow processes in certain instances. Similarly, the systems and methods described herein may conserve network bandwidth by reducing communications between enterprise devices in the processing and completion of current workflow processes.

Figure 1B:
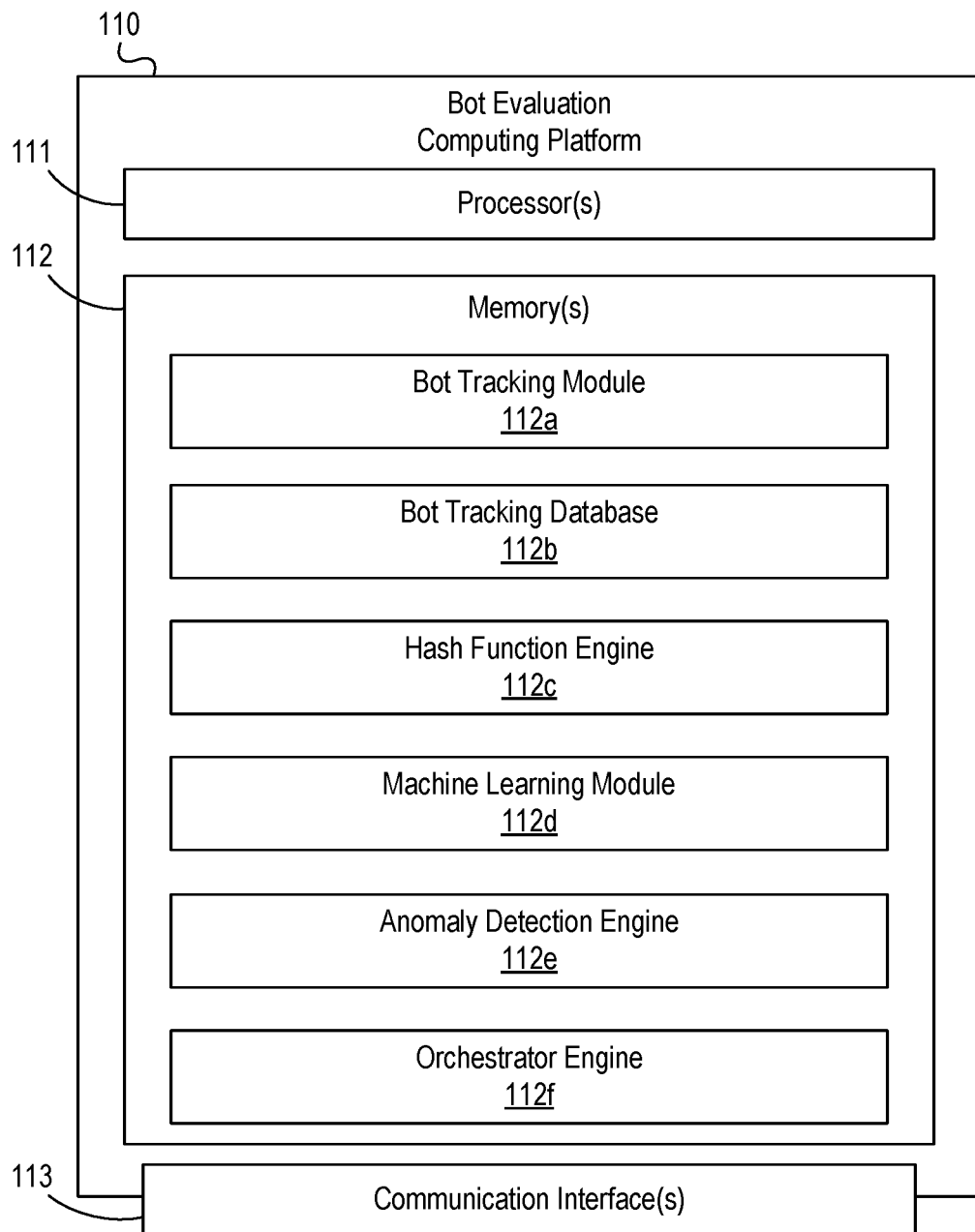

FIGS. 1A-1B depict an illustrative computing environment for monitoring, evaluating, and repairing bots in a hashchain-based distributed bot hub that process one or more tasks in a workflow queue in accordance with one or more example embodiments. Referring to FIG. 1A, computing environment 100 may include one or more devices (e.g., computer systems, communication devices, servers). For example, computing environment 100 may include a bot evaluation computing platform 110, a virtual bot host server 120, an enterprise server infrastructure 130, and an enterprise user computing device 140.

As described further below, bot evaluation computing platform 110 may be a computer system that includes one or more computing devices (e.g., servers, server blades, or the like) and/or other computer components (e.g., processors, memories, communication interfaces) that may be used to implement bot evaluation and tracking, machine learning algorithms, artificial intelligence, hashchain generation, or the like to monitor, evaluate, and repair bots in a hashchain-based distributed bot hub that process one or more tasks in a workflow queue. In some instances, the bot evaluation computing platform 110 may be maintained by an enterprise organization (e.g., a financial institution, or the like) and may be configured to receive workflow process information relating to performing a workflow that includes executing one or more tasks using a plurality of virtual bots, and determines a number of virtual bots and an arrangement of bot hubs to complete a current workflow queue. In some instances, the bot evaluation computing platform 110 may be configured to maintain a process compute a hashchain for each identified bot using a hash function engine, and may be configured to monitor and evaluate virtual bot activity in completing a workflow queue based on tracking hashchain in bot ledgers.

Virtual bot host server 120 (also referred to as a bot host server 120) may include one or more computing devices and/or other computer components (e.g., processors, memories, communication interfaces). In addition, virtual bot host server 120 include a bot orchestrator which may be configured to generate, host, transmit, and/or otherwise provide one or more virtual bot instances (which may, e.g., process items from a current work queue using at least one bot instance). In some instances, the virtual bots instantiated by the bot orchestrator of the virtual bot host server 120 may be used for processing and completing a current workflow queue or work load provided by an enterprise organization, and may include a plurality of bot hubs (e.g., bot hub-1 122a, bot hub-2 122b, bot hub-3 122c, bot hub-4 122d, . . . bot hub-N 122n) and a monitor bot hub (e.g., monitor bot hub 124) as will be described in greater detail below.

Enterprise server infrastructure 130 may include one or more computing devices and/or other computer components (e.g., processors, memories, communication interfaces). In addition, and as illustrated in greater detail below, enterprise server infrastructure 130 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which enterprise server infrastructure 130 may be deployed.

In some arrangements, enterprise server infrastructure 130 may include a server, server blade, or the like configured to host an enterprise service (e.g., a mobile banking application, ATM service, or the like). In one or more instances, the enterprise server infrastructure 130 may be configured to communicate with enterprise user devices (e.g., an enterprise user computing device 140, or the like) to process workload based on various parameters and user inputs received at enterprise user devices. In some instances, the enterprise server infrastructure 130 may be configured to cause display (e.g., at an enterprise user computing device 140, or the like), of a particular user interface based on information received from the bot evaluation computing platform 110.

Enterprise user computing device 140 may include one or more computing devices and/or other computer components (e.g., processors, memories, communication interfaces). In addition, and as illustrated in greater detail below, enterprise user computing device 140 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which enterprise user computing device 140 may be deployed.

In some arrangements, enterprise user computing device 140 may be a desktop computer, laptop computer, tablet, mobile device, or the like, and may be used by an individual such as a client or employee of an enterprise organization (e.g., a financial institution, or the like). For example, enterprise user computing device 140 may be configured to communicate with enterprise server infrastructure 130 to facilitate display of user interfaces (e.g., interfaces that generate a report of parameters associated with the completion of a workload, updates to the machine learning model calculations for completing a workload, or the like) based on received workload information.

In some arrangements, enterprise user computing device 140 may be linked to and/or used by one or more enterprise users (who may, e.g., be employees of an enterprise organization operating the enterprise center where enterprise user computing device 140 is deployed and/or used). For instance, enterprise user computing device 140 may be deployed at an enterprise center, such as the enterprise center where enterprise server infrastructure 130 is deployed, so that enterprise user computing device 140 may be used by one or more employees of an enterprise organization operating the enterprise center. For example, enterprise user computing device 140 may store and/or execute one or more enterprise applications, such as account creation and management applications, transaction history applications, lending applications, brokerage applications, and/or other applications, which may be used by the one or more enterprise users of enterprise user computing device 140.

Computing environment 100 also may include one or more networks, which may interconnect bot evaluation computing platform 110, virtual bot host server 120, enterprise server infrastructure 130, enterprise user computing device 140, or the like. For example, computing environment 100 may include a network 150 (which may interconnect, e.g., bot evaluation computing platform 110, virtual bot host server 120, enterprise server infrastructure 130, enterprise user computing device 140, and/or one or more other systems which may be associated with an enterprise organization, such as a financial institution, with one or more other systems, public networks, sub-networks, and/or the like).

In one or more arrangements, bot evaluation computing platform 110, virtual bot host server 120, enterprise server infrastructure 130, and enterprise user computing device 140 and may be any type of computing device capable of sending and/or receiving workflow data and processing the workflow accordingly. For example, bot evaluation computing platform 110, virtual bot host server 120, enterprise server infrastructure 130, enterprise user computing device 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of bot evaluation computing platform 110, virtual bot host server 120, enterprise server infrastructure 130, and/or enterprise user computing device 140 may, in some instances, be special-purpose computing devices configured to perform specific functions.

As illustrated in greater detail below, the bot evaluation computing platform 110 may include one or more computing devices configured to perform one or more of the functions described herein. For example, the bot evaluation computing platform 110 may include one or more computers (e.g., laptop computers, desktop computers, servers, server blades, or the like).

Referring to FIG. 1B, the bot evaluation computing platform 110 may include one or more processors 111, memory 112, and communication interface 113. A data bus may interconnect processor 111, memory 112, and communication interface 113. Communication interface 113 may be a network interface configured to support communication between the bot evaluation computing platform 110 and one or more networks (e.g., network 150, or the like). Memory 112 may include one or more program modules having instructions that when executed by processor 111 cause the bot evaluation computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of the bot evaluation computing platform 110 and/or by different computing devices that may form and/or otherwise make up the bot evaluation computing platform 110. For example, memory 112 may have, host, store, and/or include bot tracking module 112a, bot tracking database 112b, hash function engine 112c, machine learning module 112d, anomaly detection engine 112e, and orchestrator engine 112f.

Bot tracking module 112a may have instructions that direct and/or cause the bot tracking module to execute virtual bot tracking techniques related to monitoring and evaluation virtual bot activity while executing a workflow queue, as discussed in greater detail below. The bot tracking module 112a may also obtain information from the bot tracking database 112b, and/or may gather data from various tools available for assessing or analyzing virtual bot activity in an enterprise organization, such as virus tools, threat intelligence, proxy exceptions, and the like. The bot tracking module 112a may also obtain information from an enterprise user computing device 140, e.g., to update or more security rules, protocols, lists of potential threat indicators, and the like. In some examples, the bot tracking module 112a may obtain virtual bot metadata using a bot data extractor, may analyze and evaluate such metadata, and may initiate certain instructions to cause identified bots to be quarantined and/or repaired. As described in more detail below, anomalies identified from bot activity may be parsed to the bot tracking module 112a for evaluating bot activity on runtime so as to minimize security risks.

Bot tracking database 112b may store information used by bot tracking module 112a and/or bot evaluation computing platform 110 in application of bot evaluation and repair techniques related to completing virtual bot-based workflows, and/or in performing other related functions for processing and maintaining enterprise-managed information and resources. The bot tracking database 112b may store information received from enterprise user computing device 140 (e.g., relating to enterprise-specific security policies, settings, or preferences) and information from previous analysis of bot activity, as discussed in greater detail below.

Hash function engine 112c may have instructions that direct and/or cause the bot evaluation computing platform 110 to compute one or more hashchain values, e.g., using a one-way cryptographic hash function that takes as input specified virtual bot identification and/or task assignment and returns a numeric or alpha numeric hashchain value. Machine learning module 112d may have instructions that direct and/or cause the bot evaluation computing platform 110 to set, define, and/or iteratively refine optimization rules and/or other parameters used by the bot evaluation computing platform 110 and/or other systems in computing environment 100.

Anomaly detection engine 112e may have instructions that direct and/or cause the bot evaluation computing platform 110 to identify anomalies in bot activities, process identified anomalies to determine bot performance issues and/or security threats or vulnerabilities (e.g., as determined by bot tracking module 112a) and to determine a risk associated with such issues, security threats or vulnerabilities, e.g., for the purposes of identifying one or more corrective actions associated with an identified bot. Based on analyzing various information, the anomaly detection engine 112e may identify and transmit indications of key threats to other computing devices, such as the enterprise user computing device 140 and/or other computing devices associated with the enterprise server infrastructure 130. Based on identification of key anomalies, the anomaly detection engine 112e may compile and provide one or more reports, such as a result report, a threat report, and the like. In some examples, the anomaly detection engine 112e may also receive bot activity analysis and tracking information from the bot tracking database 112b. In some examples, the anomaly detection engine 112e may include a bot data flow anomaly detection module which may identify anomalies in data flow between bot by analyzing bot data (e.g., bot metadata).

Orchestrator engine 112f may have instructions that direct and/or cause the bot evaluation computing platform 110 to set, define, direct and/or cause a determined number of virtual bot instances to be instantiated by the virtual bot host server 120 refine optimization rules and/or other parameters used by the bot evaluation computing platform 110 and/or other systems in computing environment 100.

Figure 2A:
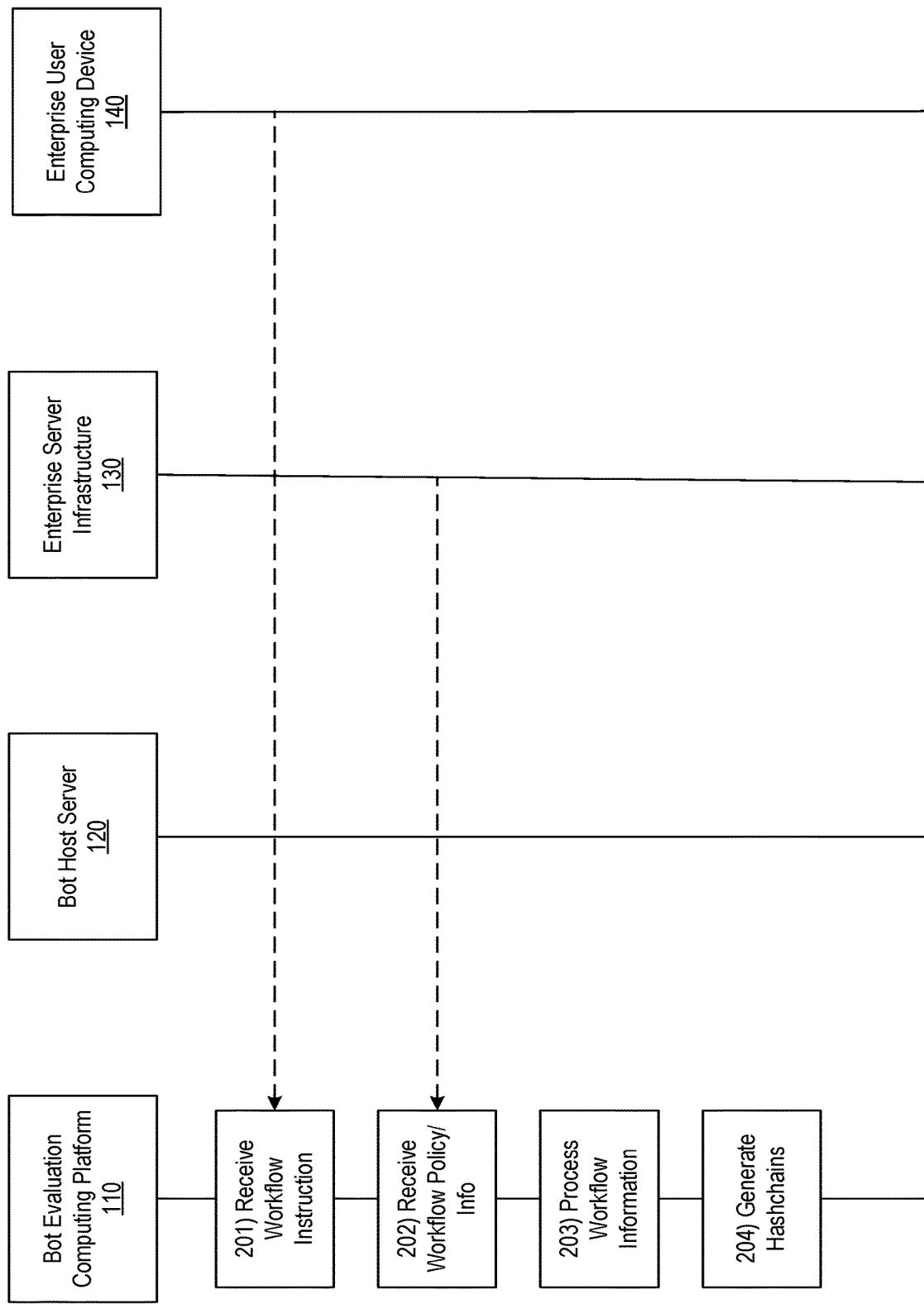

FIGS. 2A-2J depict an illustrative event sequence for monitoring, evaluating, and repairing bots in a hashchain-based distributed bot hub that process one or more tasks in a workflow queue in accordance with one or more example embodiments. Referring to FIG. 2A, at step 201, bot evaluation computing platform 110 may receive an instruction to perform a workflow process. For example, workflow process information and/or instructions may be sent from the enterprise server infrastructure 130 and/or the enterprise user computing device 140. The workflow process information may be sent or loaded by a process running on a server in the enterprise server infrastructure 130.

For example, at step 201, bot evaluation computing platform 110 may receive, via the communication interface (e.g., communication interface 113), from one or more data source computer systems (e.g., from enterprise server infrastructure 130, enterprise user computing device 140, and/or one or more other data sources), workflow process information. Workflow information received at step 201 may include information associated with performing a first workflow that includes executing one or more tasks using a plurality of virtual bots, as will be described in more detail below. The workflow process information may, for instance, include event data, transaction data, and/or activity data that is transmitted by and/or received from internal event feeds (e.g., feeds originating from sources within the enterprise organization), external event feeds (e.g., feeds originating from sources outside of the enterprise organization), internal enterprise systems (e.g., systems within the enterprise organization), external enterprise systems (e.g., systems outside of the enterprise organization), and/or other sources. The event data may, for instance, identify specific events occurring as part of a given process. The transaction data may, for instance, identify specific transactions being conducted on accounts as part of a given process. The activity data may, for instance, identify specific activity occurring as part of a given process.

At step 202, the bot evaluation computing platform 110 may receive workflow policy information or workflow security protocol information associated with a given workflow process, e.g., associated with a particular enterprise organization. For example, the workflow policy information may be sent from the enterprise server infrastructure 130 and/or the enterprise user computing device 140. The workflow policy information may be sent or loaded by a process running on a server in the enterprise server infrastructure 130. In some examples, steps 201 and 202 may occur simultaneously. In other examples, steps 201 and 202 may be two separate and distinct steps in a process as described herein. In some instances, workflow policy information may not yet exist for a given workflow process. The bot evaluation computing platform 110 may accordingly proceed without workflow policy information and/or may obtain workflow policy information of related types of processes, as will be described in greater detail below. The workflow policy information received as part of step 202 may include virtual bot schedule and distribution rules and details. In some examples, virtual bot schedule details may be extracted as part of step 202.

For example, at step 202, bot evaluation computing platform 110 may receive, via the communication interface (e.g., communication interface 113), from one or more data source computer systems (e.g., from enterprise server infrastructure 130, enterprise user computing device 140, and/or one or more other data sources), a workflow security policy and/or workflow policy information associated with an enterprise organization. The workflow policy information may, for instance, include policy information for event data, transaction data, and/or activity data that is transmitted by and/or received from internal event feeds (e.g., feeds originating from sources within the enterprise organization), external event feeds (e.g., feeds originating from sources outside of the enterprise organization), internal enterprise systems (e.g., systems within the enterprise organization), external enterprise systems (e.g., systems outside of the enterprise organization), and/or other sources. The event data may, for instance, identify specific events occurring as part of a historical process. The transaction data may, for instance, identify specific transactions being conducted on accounts as part of a historical process. The activity data may, for instance, identify specific activity occurring as part of a historical process. The bot evaluation computing platform 110 may also receive information relating to computing resources, e.g., virtual bot instances, which were utilized as part of a workflow process.

At step 203, the bot evaluation computing platform 110 may process the workflow information to identify a number of bot instances associated with process the workflow received as part of step 201. Processing the workflow information at step 203 may include verifying the workflow information received at step 201 with workflow security policy information received at step 202. In some instances, step 203 may include configuring a machine learning model for identifying a number of bots for processing a current workflow queue. For example, the bot evaluation computing platform 110 may choose one or more algorithms, define parameters, and the like. The machine learning model may be configured based on various classifications and/or regression models, such as neural networks, decisions trees, decisions forests, standard linear regressions, Bayesian regressions, and other algorithms.

The virtual bots (also referred to herein as bots, virtual bot instances, virtual machines, or virtual servers) may include a virtual representation or emulation of a physical computer. As described herein, the virtual bots may be referred to as "guests" while the physical computing device on which they run on may be referred to as the "host." Systems and methods employing virtual bots may allow for multiple virtual bots or virtual machines (e.g., each having their own operating system and applications) to run on a single physical machine. Rather than interacting directly with a physical computer, virtual bots employ a hypervisor to coordinate between the virtual bot and the physical computer that the virtual bot runs on. The hypervisor may allocate physical computing resources (e.g., processors, memory, storage, and the like) to each virtual bot. The hypervisor may keep each virtual bot separate from other virtual bots, so as to avoid the virtual bots interfering with each other. With the hypervisor operating on a physical computer or server, the operating system and applications running therein may be separated from the hardware, such that the physical computer is able to divide in one or more independent virtual machines.

The virtual machine may then run their own operating systems and applications independently while sharing resources (e.g., memory, RAM, storage, and the like) from the physical computer managed by the hypervisor. The hypervisor may sort, direct, and/or allocate computing resources of the physical computer to each of the virtual machines, and may ensure that the virtual machines do not disrupt each other. The hypervisor may run directly on the physical hardware (e.g., a server) and may take the place of the operating system. In certain instances, the hypervisor may create multiple virtual machine templates for different purposes, such as software testing, database productions, environment developments, and the like. In some instances, the hypervisor may run as an application within a host operating system and target single-user computing devices within the enterprise organization. The hypervisor may then allocate physical resources to the virtual machines, e.g., manually setting the amount of processor cores and/or memory to be used.

At step 204, the bot evaluation computing platform 110 may generate or compute a hashchain (also referred to as a hash key, hash value, hash code, or a digital fingerprint) for each identified bot of the plurality of bots, using a hash function, e.g., via the cryptographic hash function engine 112c. For example, hashchains generated at step 204 may include a trackable code specific to an associated bot. Hashchains may be generated using a one-way cryptographic hash function that provides a trackable, immutable alpha-numeric (or simply numeric) code. The hash function engine 112c may be configured to take an input, e.g., a bot identifier and/or task identifier, and return a fixed-size string on bytes, e.g., the hashchain. The hash function engine 112c may be configured to calculate a hash value for any given data using a one-way cryptographic hash function, such that it is extremely computationally difficult, if not impossible, to calculate a reverse hash function for computing the alpha-numeric text used as input in computing the hash function. Further, the hash function engine 112c may be configured such that it is extremely unlikely, if not impossible, for two different inputs to have the same hash. The hash function engine 112c may thus take a string of any length as input and produce, for the hash value, a fixed length string which acts as a kind of signature for the input data provided. In this way, the original input cannot be computed based on the hash value. In this manner, the hash function engine 112c may employ a cryptographic hash function that behaves much like a random function while still being deterministic and efficiently computable. In some examples, computing the hashchain for each identified bot of the plurality of bots may include assigning an identification code for the associated bot and a task code associated with at least one task to be executed by the associated bot. In some examples computing the hashchain for each identified bot of the plurality of bots may include evaluating the one or more tasks of the first workflow and assigning bot with an identifier in accordance with the one or more tasks. In some examples, computing the hashchain for each identified bot of the plurality of bots may include determining a relative permanence of a task of the one or more tasks of the first workflow and attributing a portion of the hashchain based on the relative permanence of the task.

In some examples, hash keys generated at step 204 may group bots for evaluation, as will be described in more detail below. As a further example, hash keys may form bot hubs based on workflow match keys. Bots may be assigned with incremental identifiers based on tasks in a workflow that will be processed by the bots. In some examples, generating hashchains at step 204 may include distributing of a workflow to different bots and generating hashchains in accordance with distributed tasks. In some examples, generating hashchains at step 204 may include evaluating a level of permanence of tasks in the workflow and generating hashchains having a fixed identifier component and a session-specific identifier component. Session specific hashchains may ensure that bot ledgers are cleaned up once a workflow is over and one or more bots are reprocessed with a clean ledger.

Figure 2B:
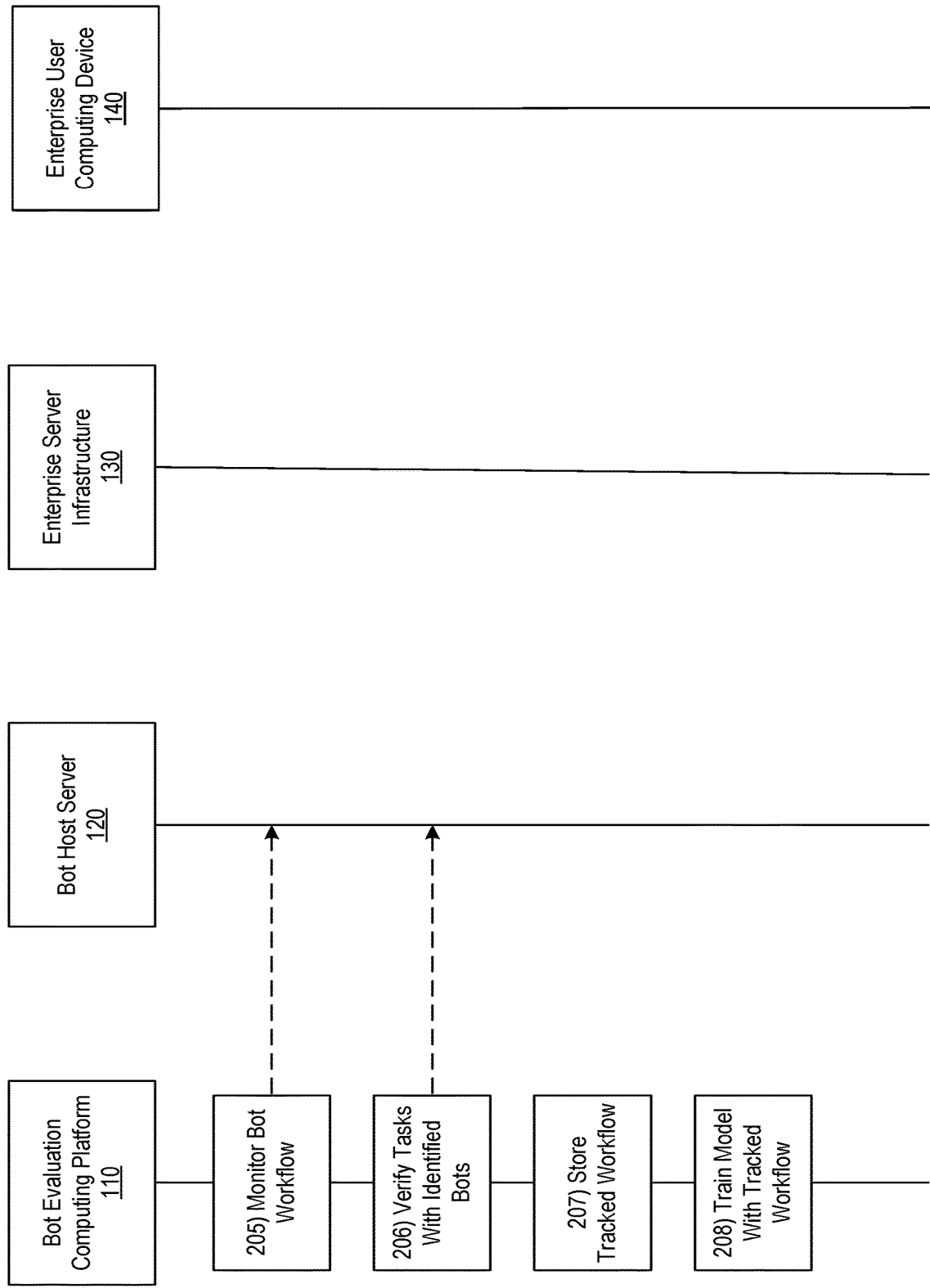

Referring to FIG. 2B, at step 205, and upon bots executing the workflow associated with the workflow information received as part of step 201 and/or step 202, bot evaluation computing platform 110 may monitor bot workflow by bots on the bot host server 120. In some instances, the bot evaluation computing platform 110 may automatically monitor bot workflow upon sending instructions to the bot host server 120 to instantiate bots to perform the workflow. In that regard, the bot evaluation computing platform 110 may transmit a workflow start instruction to a bot orchestrator on the bot host server 120 to cause the bot orchestrator to instantiate bots to process the one or more tasks of the workflow. An orchestrator engine of the virtual bot host server 120 may instantiate at least one virtual bot instance corresponding to the identified number of bots and process items from the current workflow queue using the at least one bot instance, as described in greater detail below. The bot host server 120 may include an orchestration engine to instantiate or spin down a number of virtual bots or virtual machines. In some arrangements, the virtual machines or bots may be hosted or executed on the bot evaluation computing platform 110 itself. Such virtual bot instance determination may, for instance, include a number or virtual bots as well as related parameters associated with the bots. As part of step 205, bot evaluation computing platform 110 may compare monitored workflow with information related to the current workflow queue, e.g., received from enterprise user computing device 140. In monitoring the current workflow, bot evaluation computing platform 110 may generate and/or send one or more commands to the bot host server 120 directing the bot host server 120 to capture various types of data relating to the current workflow, including metadata and workflow execution information shared and stored by the various bots (e.g., stored in hashchain ledgers of each bot), workflow process steps and statuses, process resources, current estimated runtimes, and/or other related information. In some examples, transmitting the workflow start instruction to the bot orchestrator on the bot host server 120 may further cause the virtual bot server to distribute the one or more tasks of the workflow to the plurality of bots in accordance with associated hashchains of each of the plurality of bots. In some examples, transmitting the workflow start instruction to the bot orchestrator on the bot host server 120 may further cause the bot host server 120 to form a plurality of bot hubs, and each bot hub may include one or more bots of the plurality of bots, as will be described in more detail below. The plurality of bot hubs may then be formed by matching workflow keys from the workflow information to portions of hashchains of the plurality of bots.

At step 206, bot evaluation computing platform 110 may verify tasks being performed by identified bots, e.g., based on a bot's hashchain ledger and analysis of the current workflow. In verifying tasks, bot evaluation computing platform 110 may, for instance, input various parameters obtained with the current work queue information into an algorithm of the machine learning model for comparison with actual workflow information received as part of step 205. In some examples, the bot evaluation computing platform 110 Subsequently, the computing platform may monitor the bots performing the one or more tasks of the workflow by verifying tasks of identified bots, at step 206, based on analyzing hashchains of bots performing tasks of the first workflow to identify a potential anomalous activity by at least one bot. In some examples, monitoring the bots may include analyzing a ledger associated with a respective bot of each of the bots. The ledger may include metadata of the respective bot and of other bots performing a common task of the first workflow. In addition, the bot evaluation computing platform 110 may consider other information related to the current workflow queue, such as an estimated time to complete the workflow, process step information for various steps of the current workflow, and the like. In some examples, at step 206, bot evaluation computing platform 110 may train a machine learning model by providing a dataset based on workflow process to produce a trained model. For instance, bot evaluation computing platform 110 may receive historical workflow information associated with non-anomalous activity when processing a workflow (e.g., considering utilization of implemented resources, such as number of bots, processing time, and the like) and/or features associated with more optimal workload processing. Such information may, for instance, indicate specific parameters or settings, specific to a given process, that are correlated with typical (e.g., non-anomalous) workflow processing. Subsequently, bot evaluation computing platform 110 may process the monitored workflow activity information (e.g., using a machine learning engine and/or machine learning application programming interface (API)) to create, train, and/or otherwise generate the machine learning model. Each bot executing tasks of the workflow process may have a ledger containing metadata that includes entries of activities of the associated bot as well as neighboring bots. At step 206, the bot evaluation computing platform 110 may compare ledger entries of each bot with expected ledger entries based on workflow information. In some instances, comparing ledger entries with expected behavior, the bot evaluation computing platform 110 may be configured to determine anomalies in the workflow process, e.g., based on a suspicious bot or a malfunctioning bot. Information considered as part of step 206 may include metadata for the respective bot and partial metadata of neighboring bots being tracked by the respective bot.

At step 206, bot evaluation computing platform 110 may apply the machine learning model configured at step 203 to the activity monitored at step 205. For example, at step 206, bot evaluation computing platform 110 may apply a machine learning model to the monitored activity based on information received from the one or more data source computer systems relating to a given workflow process. For instance, bot evaluation computing platform 110 may apply the model to return one or more results indicating whether monitored conditions indicate an anomaly in the workflow process (e.g., based on virtual bots utilized relevant to events, transactions, activity, or the like in a process). In applying the model to the monitored activity information, bot evaluation computing platform 110 may compute a score within the range of 0 to 1, where 0 represents extremely anomalous activity and 1 represents fully expected and non-anomalous activity, based on the distance(s) between the workflow process information and corresponding features of the machine learning model. In some examples, analyzing a ledger may include analyzing metadata relative to the workflow information or metadata of neighboring bots associated with the same task, and/or comparing a ledger entry to an expected ledger entry. The expected ledger entry may be based on the workflow information. In some examples, a machine learning model may be trained to verify non-anomalous bot interactions based on tracked workflow information from monitoring one or more previous workflows, as described in more detail herein.

In some embodiments, configuring the machine learning model to the information received from the one or more data source computer systems may include applying the machine learning model to workflow process data received from an enterprise center system deployed at the enterprise center. For example, in training the machine learning model to the information received from the one or more data source computer systems (e.g., enterprise server infrastructure 130, enterprise user computing device 140) at step 201 and/or step 202, bot evaluation computing platform 110 may train the machine learning model to process workflow information received from an enterprise center system (e.g., enterprise server infrastructure 130) deployed at the enterprise center. For instance, the workflow process information received from the enterprise center system (e.g., enterprise server infrastructure 130) deployed at the enterprise center may include a list of processes (e.g., process identifiers, process steps, process types, process resource requirements, and/or other process step properties) that are currently present at and/or have been recently detected at the enterprise center.

In some embodiments, training the machine learning model to the workflow process information received from the one or more data source computer systems may include training the machine learning model to internal data received from the enterprise center system deployed at the enterprise center, where the enterprise center is operated by an enterprise organization. For example, in training the machine learning model to the workflow process information received from the one or more data source computer systems (e.g., enterprise server infrastructure 130, enterprise user computing device 140) at step 206, bot evaluation computing platform 110 may train the machine learning model to internal data received from the enterprise center system (e.g., enterprise user computing device 140) deployed at the enterprise center, where the enterprise center is operated by an enterprise organization.

In some embodiments, training the machine learning model to the workflow process information received from the one or more data source computer systems may include training the machine learning model to external data received from a third-party system deployed at a third-party center different from the enterprise center, where the third-party center is operated by an organization different from the enterprise organization. For example, in training the machine learning model to the workflow process information received from the one or more data source computer systems (e.g., enterprise server infrastructure 130, enterprise user computing device 140), then at step 206, bot evaluation computing platform 110 may train the machine learning model to external data received from a third-party system deployed at a third-party center different from the enterprise center, where the third-party center is operated by an organization different from the enterprise organization.

In some embodiments, verifying tasks of identified bots at step 206 may include prompting an enterprise associate at the enterprise center (e.g., via enterprise user computing device 140) to corroborate monitored activity by bots executing the workflow process. For example, at step 206, bot evaluation computing platform 110 may prompt an enterprise associate at the enterprise center to corroborate monitored activity by bots executing the workflow process. For instance, in prompting the enterprise associate at the enterprise center to corroborate monitored activity by bots executing the workflow process, bot evaluation computing platform 110 may ask the associate to provide input confirming bot activity identified as potentially anomalous, e.g., based on comparisons to received workflow information, workflow security policies, and/or based on accessed enterprise information or computing resources. In response, the associate may provide a confirmation of the identified bot activity, or may provide feedback that the bot activity is abnormal and recommending the identified bot be quarantined, as will be described in more detail below.

At step 207, upon verifying tasks being performed by identified bots, the bot evaluation computing platform 110 may store tracked workflow information, e.g., to the bot tracking database 112*b*. Stored workflow information may be used to further refine models used for analyzing and verifying ongoing bot activity information. At step 208, the bot evaluation computing platform 110 may train a machine learning model to identify potentially anomalous activity based on at least the workflow information stored as part of step 207. In some examples, at step 208, bot evaluation computing platform 110 may train a machine learning model by using stored workflow information to produce a trained model. For instance, bot evaluation computing platform 110 may use historical workflow information that is stored in the bot tracking database 112*b* and associated with non-anomalous activity to train a machine learning model to verify a current workflow (e.g., considering utilization of implemented resources, number of bots, processing time, and the like) and/or features associated with more optimal workload processing. Such information may, for instance, indicate specific parameters or settings, specific to a given process, that are correlated with typical (e.g., non-anomalous) workflow processing. Subsequently, bot evaluation computing platform 110 may process the stored workflow information (e.g., using a machine learning engine and/or machine learning application programming interface (API)) to create, train, and/or otherwise generate the machine learning model.

Figure 2C:
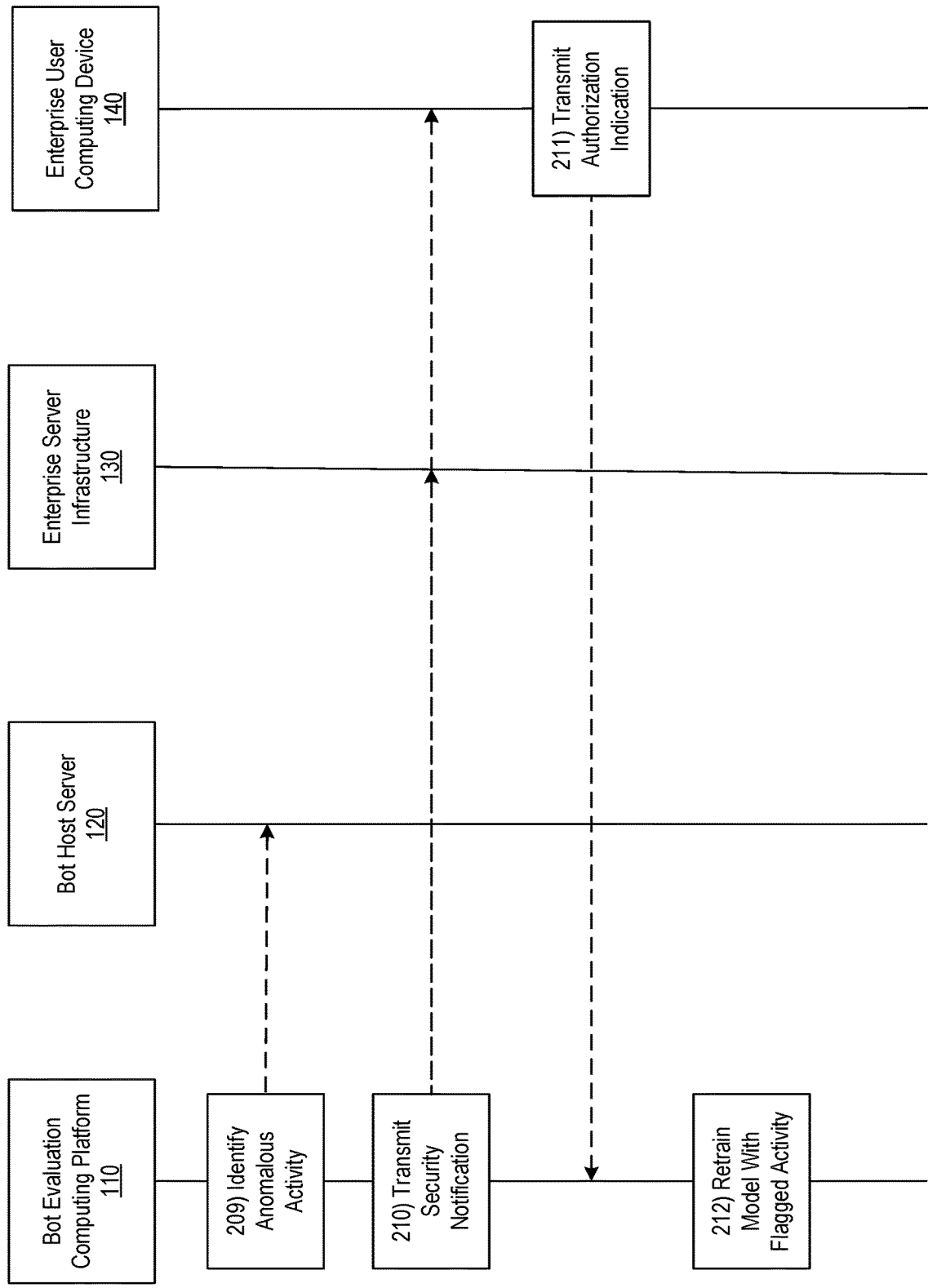

Referring to FIG. 2C, at step 209, the bot evaluation computing platform 110 may identify anomalous activity in bots executing tasks in a given workflow, based on verification performed as part of step 206. For instance, at step 209, certain types or magnitudes of monitored activity may automatically trigger characterization of that activity and/or the associated bot as anomalous. In some instances, certain types or magnitudes of monitored activity may cause the bot evaluation computing platform 110 to obtain verification of that activity from an enterprise user, e.g., operating the enterprise user computing device 140. In some instances, step 209 may include the bot evaluation computing platform 110 transmitting a notification to an enterprise user, e.g., associated with the enterprise user computing device 140, indicating that potentially anomalous activity has been detected by the bot evaluation computing platform 110, and/or providing additional detail related to the detected activity, such as the tasks involved, associated discrepancies in bot behavior, completion status of the current workflow queue, resources accessed while executing tasks of the current workflow queue, and the like. In some instances, potentially anomalous activity may be specific to a bot of hub of bots hosted on the bot host server 1201 while in some instance the potentially anomalous activity, though associated with a bot hosted on the bot host server, may be potential external or network-wide impact in the enterprise organization.

At step 210, the bot evaluation computing platform 110 may transmit a security risk notification to an enterprise computing device, such as a device associated with the enterprise server infrastructure 130 and/or the enterprise user computing device 140. For instance, at step 210, a notification may be sent to the enterprise server infrastructure 130 and/or the enterprise user computing device 140 providing information relating to an identified anomalous bot activity, status of the current workflow queue, potentially compromised enterprise resources, potential impact to completion of the current workflow queue, and the like. For example, at step 210, the bot evaluation computing platform 110 may generate one or more messages based on identification of potentially anomalous activity and may transmit the one or more messages to the enterprise user computing device 140. The one or more alert messages generated by bot evaluation computing platform 110 may, for instance, include any and/or all of the information captured by bot evaluation computing platform 110, such as process information, process type information, virtual bot instance information, process resource information, and/or other information.

Figure 3:
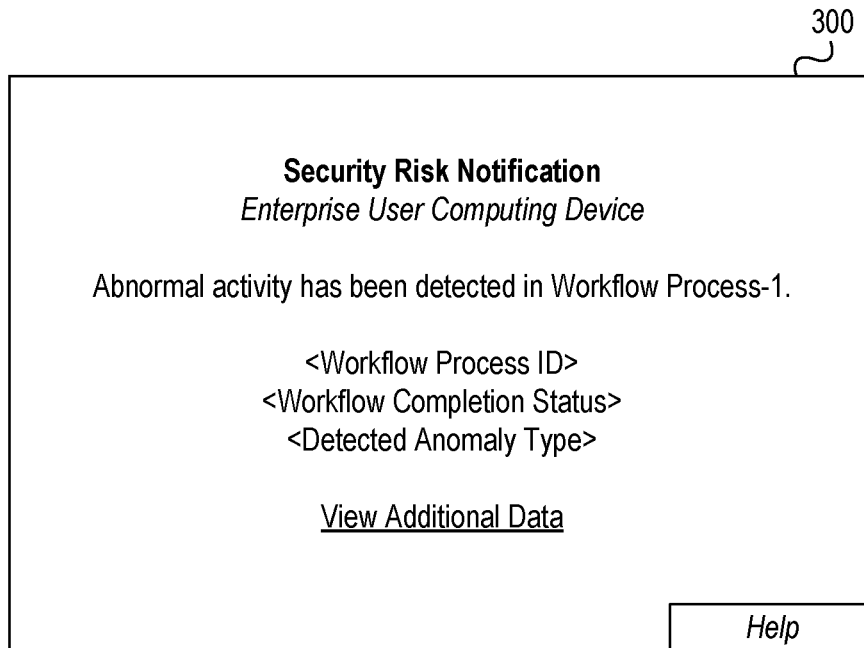
FIGS. 3-5 depict example graphical user interfaces relating to notifications sent to an enterprise user computing device as part of monitoring, evaluating, and repairing virtual bots in a hashchain-based distributed bot hub that process one or more tasks in a workflow queue in accordance with one or more example embodiments.

Additionally or alternatively, in providing the display related a security risk notification and identified anomalous bot activity, the bot evaluation computing platform 110 may generate and/or send information to a device linked to an enterprise associate (e.g., enterprise user computing device 140) which may cause enterprise user computing device 140 to generate, display, and/or otherwise present a graphical user interface similar to graphical user interface 300, which is illustrated in FIG. 3. As seen in FIG. 3, graphical user interface 300 may include text and/or other information indicating that anomalous or abnormal bot activity has been detected by the bot evaluation computing platform 110 (e.g., "Abnormal activity has been detected in Workflow Process-1."), providing the workflow information and information related to the identified abnormality/anomaly (e.g., number of bot impacted, bot identifiers of the impact bot(s), identification of the workflow process, status of the workflow process, type of anomaly detected, timing to complete the workflow queue, resources used to complete the workflow queue, and the like), as well as one or more user-selectable controls allowing the user of enterprise user computing device 140 to view the additional data relating to the machine leaning model calculations and associated parameters (e.g., "View Additional Data").

At step 211, the enterprise user computing device 140 may transmit an authorization indication to the bot evaluation computing platform 110 in response to the security notification. For example, at step 211, the enterprise user computing device 140 may transmit an authorization indication in response to a user interacting with a portion of graphical user interface 300 shown in FIG. 3. The indication transmitted as part of step 211 may provide that the identified anomalous activity does not pose an issue to the completion of a current workflow queue, in which case the bots on bot host server will continue processing the current workflow queue and the bot evaluation computing platform 110 with continue monitoring bot processing the current workflow queue. The indication transmitted as part of step 211 may provide that the identified anomalous activity poses an issue, thus triggering the bot evaluation computing platform 110 to initiate a bot quarantine/repair process which will be described in more detail below. In some examples, identifying potential anomalous activity may trigger a quarantine process on at least one bot. The quarantine process may include removing the at least one bot from the first workflow, transmitting a notification to an enterprise computing device, such as enterprise user computing device 140, providing a security risk notification associated with the potential anomalous activity, and transmitting an alert to other bots in a common bot hub as the at least one bot.

At step 212, the bot evaluation computing platform 110 may retrain the machine learning model based on flagging activity that has been identified as potentially anomalous. In some examples, at step 212, bot evaluation computing platform 110 may retrain a machine learning model by using flagged workflow activity that has been verified (or confirmed to not be verified) by an enterprise user associate with the enterprise user computing device 140. For instance, bot evaluation computing platform 110 may use workflow information initially indicated as anomalous but verified by the enterprise user computing device 140 as authorized activity to retrain the machine learning model to verify ongoing workflow (e.g., such that similar activity when analyzed subsequently may not be flagged an anomalous). Such information may, for instance, further refine specific parameters or settings, specific to a given process, that are correlated with typical (e.g., non-anomalous) workflow processing. In some instances, bot evaluation computing platform 110 may use workflow information initially indicated as well as verified by the enterprise user computing device 140 as anomalous activity to retrain the machine learning model to verify ongoing workflow (e.g., such that similar activity when analyzed subsequently may be more likely to be flagged an anomalous). Subsequently, bot evaluation computing platform 110 may process the stored flagged activity (e.g., using a machine learning engine and/or machine learning application programming interface (API)) to create, train, and/or otherwise generate the machine learning model.

Figure 2D:
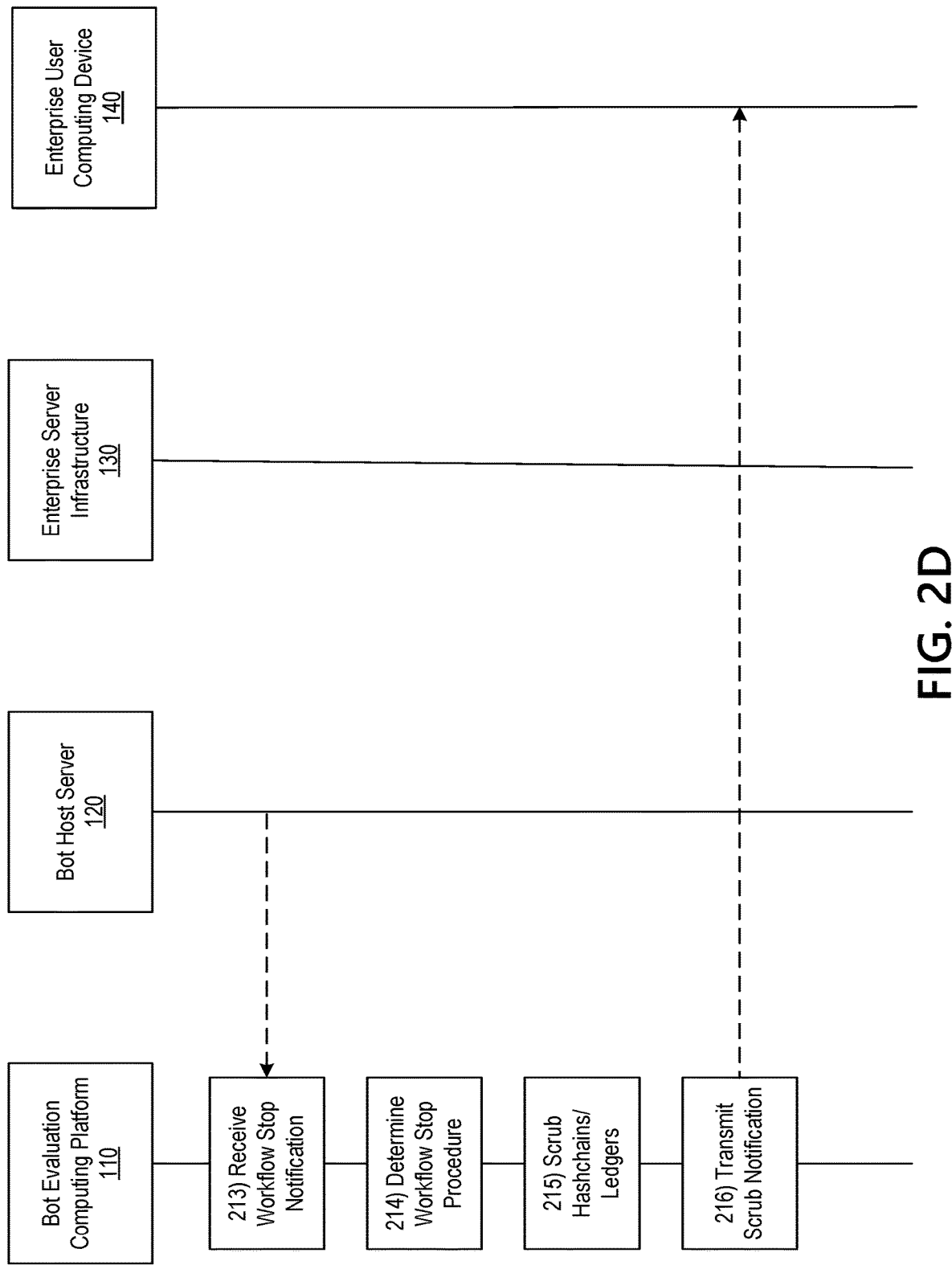

Referring to FIG. 2D, at step 213, bot evaluation computing platform 110 may receive a workflow stop notification from bot host server 120. For example, at step 213, bot evaluation computing platform 110 may receive, via the communication interface (e.g., communication interface 113), from bot host server 120, a notification indicating the current workflow queue is to be stopped and/or providing certain conditions for which the current workflow queue is to stop. Such the notification received as part of step 213 may be based on an indication from the bot host server 120 that the current workflow queue has completed or will be completed at a specific time.

Upon receiving the workflow stop notification, at step 214, bot evaluation computing platform 110 may determine a workflow stop procedure. For example, at step 214, bot evaluation computing platform 110 may a relevant permanence of hashchains and related ledgers based on workflow information and workflow security policy information received at step 201 and/or step 202. Similarly, the bot evaluation computing platform 110 may determine a workflow stop procedure as part of information received with the workflow stop notification. In another instance, the bot evaluation computing platform 110 may determine workflow stop procedure based on the number of occurrences, if any, of anomalous activity while processing the current workflow queue.

At step 215, bot evaluation computing platform 110 may scrub hashchains and bot ledgers, upon determining that the workflow stop procedure includes scrubbing session specific metadata. At step 216, the bot evaluation computing platform 110 transmit a notification to the to an enterprise computing device, such as a device associated with the enterprise server infrastructure 130 and/or the enterprise user computing device 140, indicating that a scrub process has completing if the hash chains and related bot ledgers are session specific. Accordingly, bots hosted on the bot host server 120 will be scrubbed of metadata associated with the workflow queue that has been executed and may subsequently begin a new workflow without maintaining metadata associated with the previous workflow.

Figure 2E:
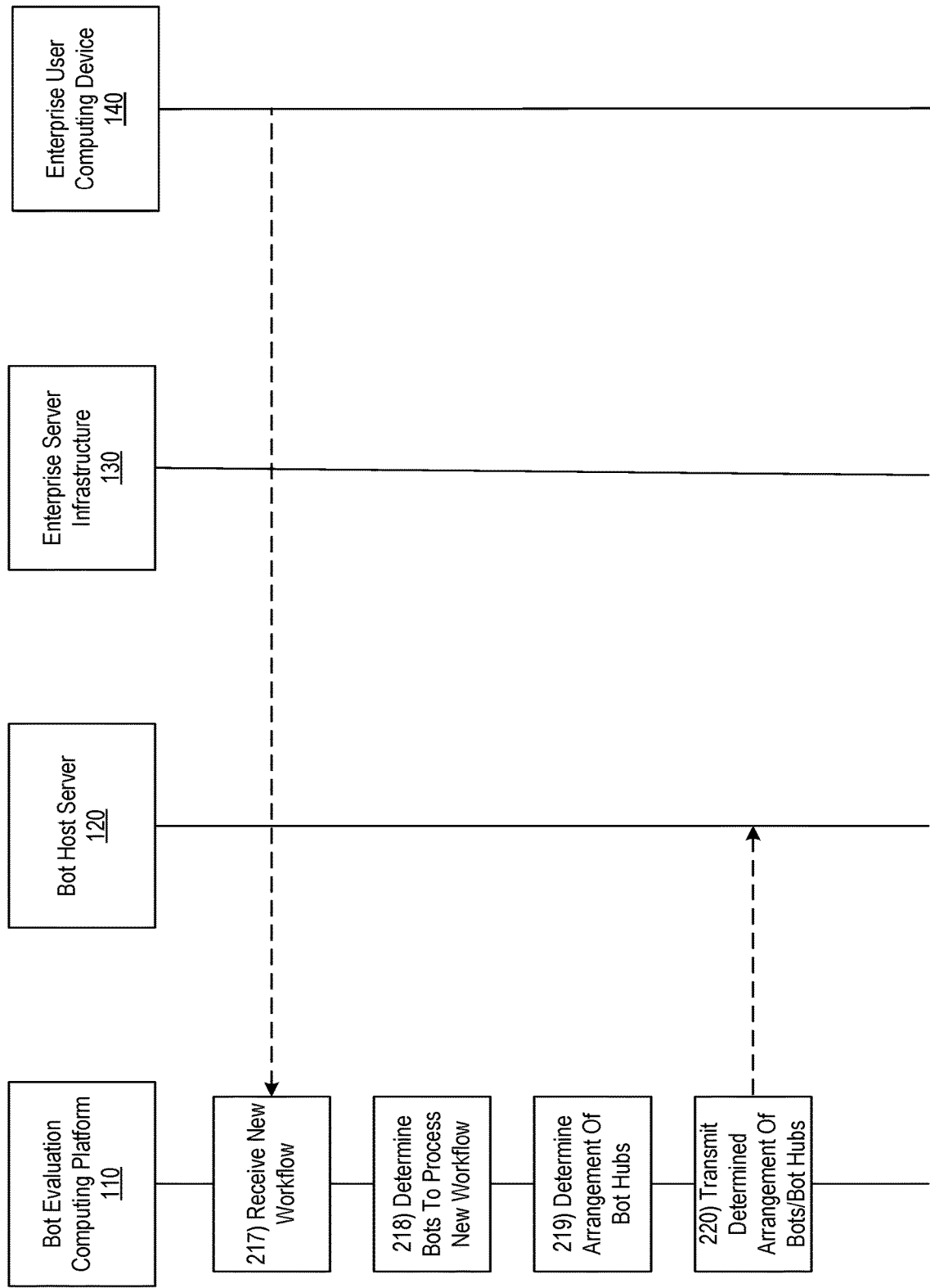

Now referring to FIG. 2E, a process is shown for forming a bot hub architecture that includes receiving a new work flow, arranging one or more bot hubs, monitoring activity of bot hubs using a monitor bot hub, and/or performing a quarantine/repair process upon identifying a bot with abnormal activity. For example, upon starting a new process, at step 217, the bot evaluation computing platform 110 may receive a new workflow process information from an enterprise computing device, such as the enterprise user computing device 140. In some instances, the bot evaluation computing platform 110 may receive new workflow process information automatically upon the enterprise server infrastructure 130 loading a new process and/or the enterprise user computing device 140 transmitting a prompt to start a new workflow process. The workflow process instruction may include workflow information associated with performing a first workflow process by executing one or more tasks using a plurality of virtual bots. In some examples, the bot evaluation computing platform 110 may receive new workflow process information based on validation information and/or labeled data received from the enterprise server infrastructure 130, enterprise user computing device 140 and/or one or more other sources. Receiving new workflow process information at step 217 may occur subsequent to transmitting the scrub notification at step 216, such that the enterprise user computing device may send the new workflow process information after confirming that previous workflow metadata has been scrubbed.

At step 218, the bot evaluation computing platform 110 may determine a number of bots to process the new workflow process based on analyzing the new workflow process information. In some instances, the bot evaluation computing platform 110 may use a machine learning model to determine a number of bots to process the new workflow process. The bot evaluation computing platform 110 may determine bot schedules and distribution details as part of step 218. The bot evaluation computing platform 110 may process workflow information to identify the plurality of bots by training the machine learning model based on robotic process automation using workflow process instruction and historical workflow data. In some examples, processing the workflow information to identify a plurality of bots may include determining, using the machine learning model, an optimal number of bots to process the workflow.

At step 219, the bot evaluation computing platform 110 may determine an arrangement of bot hubs for the number of bots to process the new work flow. Each bot hub may include at least one bot and bots within a common bot hub may share metadata while executing one or more tasks of a workflow process. In some instances, the bot evaluation computing platform 110 may use a machine learning model to determine the arrangement of bot hubs to optimize execution of the new workflow process. The bot evaluation computing platform 110 may determine the arrangement of bot hubs based on the new workflow information and based on arrangements of bots in workflows previously monitored by the bot evaluation computing platform, e.g., for which related information is stored in the bot tracking database 112b. The bot evaluation computing platform 110 may determine the arrangement of bot hubs based on matching workflow keys of bots in the plurality of bots to form an associated bot hub, and/or aligning one or more bots of the plurality of bots based on common tasks of the first workflow. At step 220 the bot evaluation computing platform 110 may transmit the determined number of bots and arrangement of bot hubs to the bot host server 120.

Figure 2F:
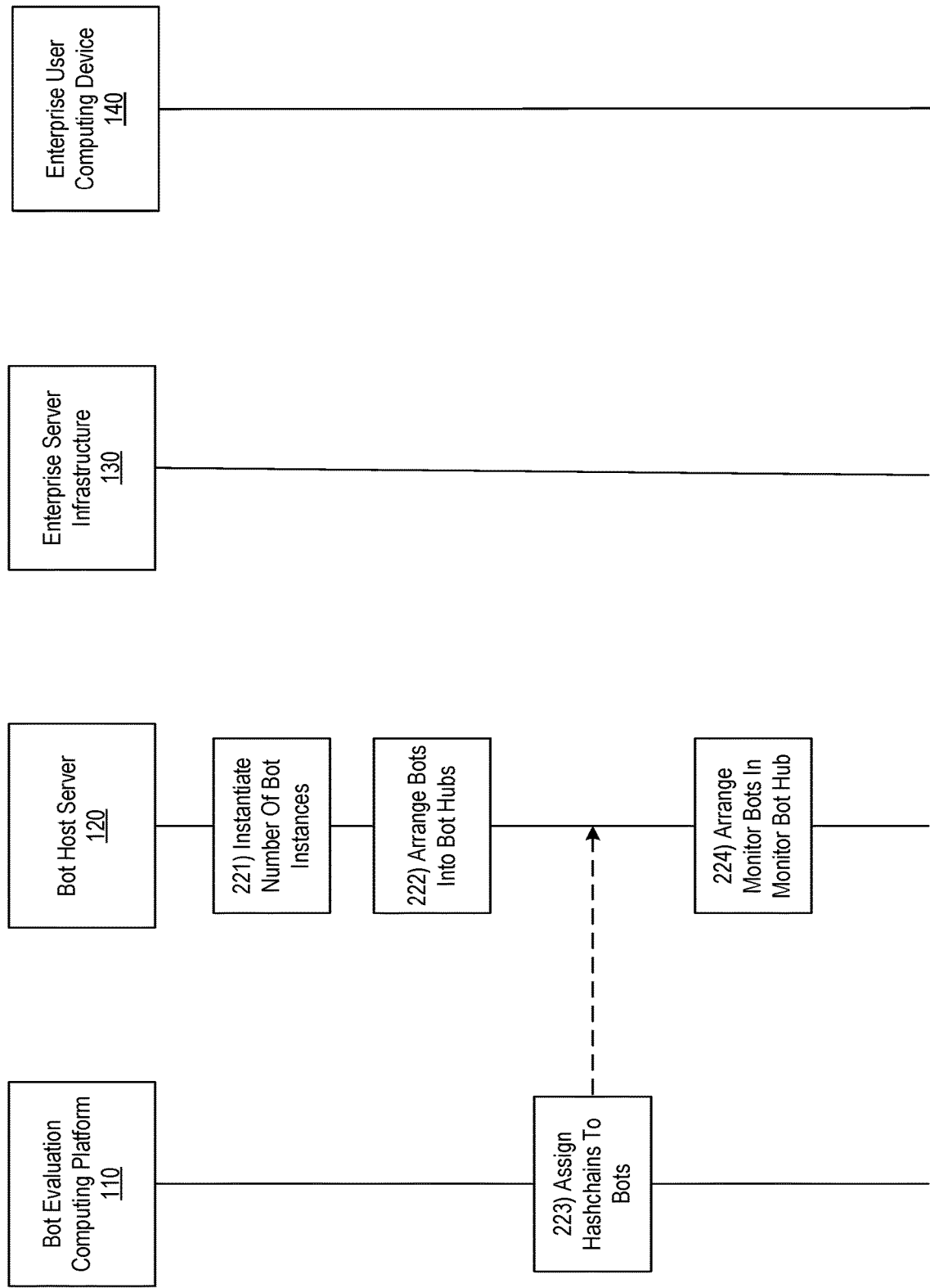

Now referring to FIG. 2F, upon starting a new process, at step 221, an orchestrator engine of the bot host server 120 may instantiate at least one virtual bot instance corresponding to the determined number and process items from the current work queue using the at least one bot instance, as described in greater detail below. The bot host server 120 may include an orchestration engine to instantiate or spin down a number of virtual bots or virtual machines. In some arrangements, the virtual machines or bots may be hosted or executed on the bot evaluation computing platform 110 itself. Such virtual bot instance determination may, for instance, include a number or virtual bots as well as related parameters associated with the bots. At step 222, an orchestrator engine of the bot host server 120 may form one or more bot hubs to execute tasks of the new workflow. In some instances, the bot hubs may be arranged based on alignment of common task to be performed by the bots while executing the new workflow.

At step 223, the bot evaluation computing platform 110 may compute hashchain for each of the determined number of bots. In some instances, the hashchains may include workflow match keys that align bots of certain bot hubs based on common tasks. Hashchains may be computed using a hash function. In some instances, the bot evaluation computing platform 110 may determine a subset of bots for an associated bot hub by matching components of hashchains associated with one or more tasks of the first workflow. For example, hashchains generated at step 223 may be generated in a manner similar to those generated at step 204, and may include a trackable code specific to an associated bot. Hashchains may be generated using a one-way cryptographic hash function that provides a trackable, immutable alpha-numeric (or simply numeric) code. The hash function engine 112c may be configured to take an input, e.g., a bot identifier and/or task identifier, and return a fixed-size string on bytes, e.g., the hashchain. The hash function engine 112c may be configured to calculate a hash value for any given data using a one-way cryptographic hash function, such that it is extremely computationally difficult, if not impossible, to calculate a reverse hash function for computing the alpha-numeric text used as input in computing the hash function. Further, the hash function engine 112c may be configured such that it is extremely unlikely, if not impossible, for two different inputs to have the same hash. The hash function engine 112c may thus take a string of any length as input and produce, for the hash value, a fixed length string which acts as a kind of signature for the input data provided. In this way, the original input cannot be computed based on the hash value. In this manner, the hash function engine 112c may employ a cryptographic hash function that behaves much like a random function while still being deterministic and efficiently computable. In some examples, computing the hashchain for each identified bot of the plurality of bots may include assigning an identification code for the associated bot and a task code associated with at least one task to be executed by the associated bot. In some examples computing the hashchain for each identified bot of the plurality of bots may include evaluating the one or more tasks of the first workflow and assigning bot with an identifier in accordance with the one or more tasks. In some examples, computing the hashchain for each identified bot of the plurality of bots may include determining a relative permanence of a task of the one or more tasks of the first workflow and attributing a portion of the hashchain based on the relative permanence of the task.

In some examples, hash keys generated at step 223 may group bots for evaluation, and hash keys may form bot hubs based on workflow match keys. Bots may be assigned with incremental identifiers based on tasks in a workflow that will be processed by the bots. In some examples, generating hashchains at step 223 may include distributing of a workflow to different bots and generating hashchains in accordance with distributed tasks. In some examples, generating hashchains at step 223 may include evaluating a level of permanence of tasks in the workflow and generating hashchains having a fixed identifier component and a session-specific identifier component. Session specific hashchains may ensure that bot ledgers are cleaned up once a workflow is over and one or more bots are reprocessed with a clean ledger.

At step 224, an orchestrator engine of the bot host server 120 may form a monitor bot hub that includes a closed network of monitor bots configured to observe other bot hubs and to store metadata associated with observing other bot hubs. For example, as shown in FIG. 1A, a monitor bot hub 124 may monitor workflow by bot hubs 122a, 122b, . . . 122n of the bot host server 120, e.g., using hashchain ledgers of each bot. In some examples, metadata may be shared with other bot hubs during workflow. The bot hubs 122a, 122b, . . . 122n may be configured to process tasks from a workflow using the at least one bot, and the monitor bot hub 124 may be configured to monitor the bot hubs 122a, 122b, . . . 122n and identify potential abnormal or anomalous activity. In some examples, the monitor bot hub 124 may remove an identified bot to a quarantine hub based on an observation that the identified bot in another bot hub (e.g., any of bot hubs 122a, 122b, . . . 122n) exhibits abnormal behavior, and execute a repair process on the identified bot in the quarantine hub. In some examples, the monitor bot hub 124 may issue a monitor bot from the monitor bot hub 124 to replace the identified bot in the other bot hub while the identified bot remains in the quarantine hub. Upon removing the identified bot to the quarantine hub, a quarantined bot notification may be transmitted to an enterprise computing device, as will be discussed in more detail below. Sending the quarantined bot notification may cause the enterprise computing device 140 to display one or more graphical user interfaces providing information associated with the first workflow and the identified bot in the quarantine hub. In some examples, upon completing the workflow, the bot evaluation computing platform 110 may determine if the machine learning model is to be updated based on comparing one or more computing metrics associated with completion of the workflow to one or more computing metrics from historical workflow data, and may retrain the machine learning model to identify an arrangement of bot hubs to complete a workflow based on the comparing.

Figure 2G:
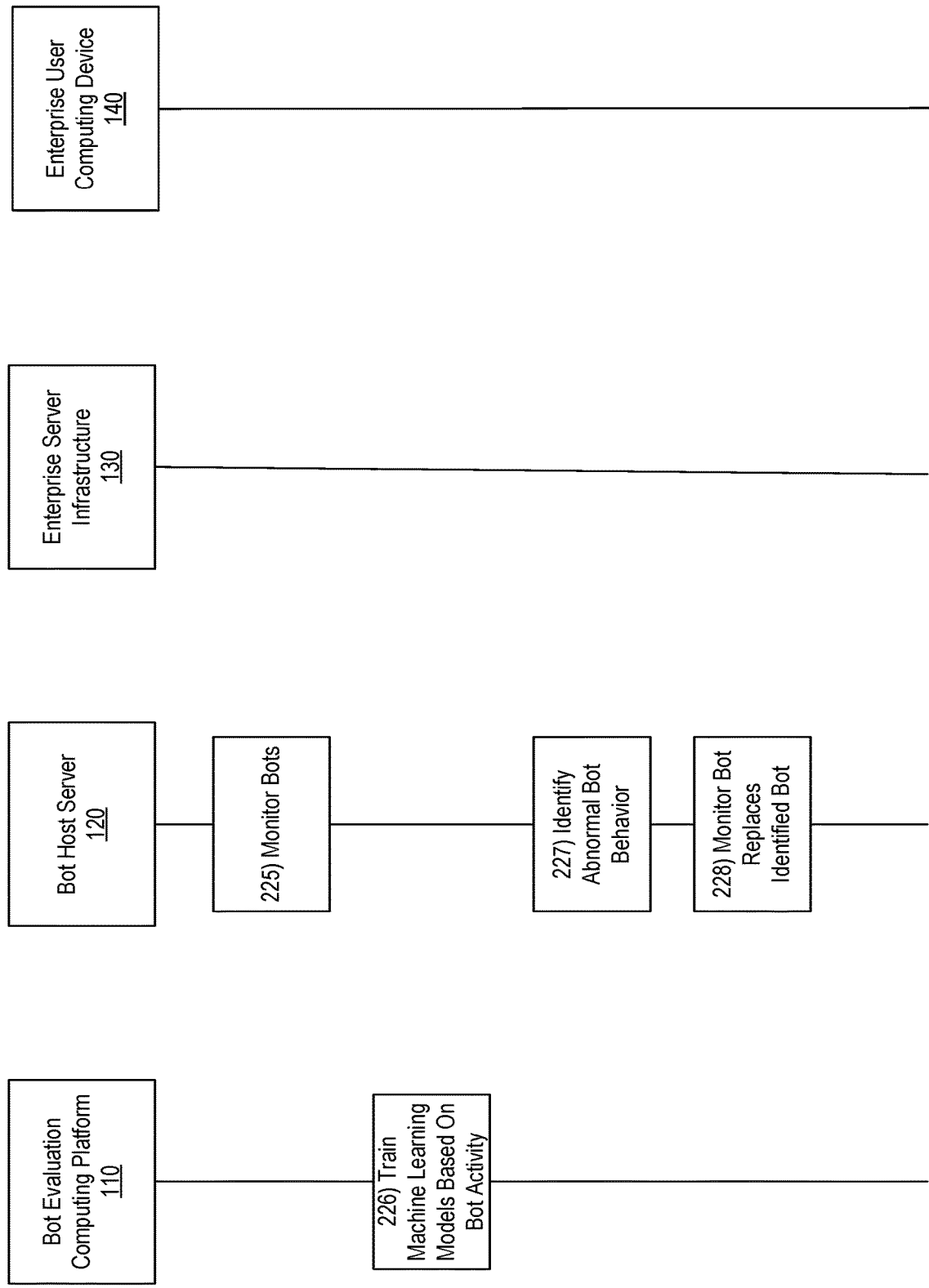

Now referring to FIG. 2G, a process is shown for using a dynamic workflow engine to trigger an identified abnormal bot for quarantine, remove the identified bot from its respective enterprise bot hub, and issue replacement bot from a monitoring bot hub to fill in for the quarantined bot during a quarantine interval. For example, at step 225, the bot host server 120, via the monitor bot hub 124, may monitor bots in bot hubs, e.g., bot hubs 122a, 122b, . . . 122n, that are executing one or more tasks in a workflow, e.g., by monitoring hashchain ledgers of the bots. monitors 122. In some examples, the monitor bot hub 124 may monitors bots performing one or more tasks of a workflow to identify a potential anomalous activity by at least one bot. In some instances, bots may monitor other bots to identify a potential anomalous activity. In some examples, the bot evaluation computing platform 110 may perform monitor of the bots performing one or more tasks in the workflow.

At step 226, the bot evaluation computing platform 110 may train a machine learning model based on ongoing monitored bot behavior and/or activity in performing one or more tasks in the workflow. In some instances, the bot evaluation computing platform 110 may use a machine learning model to more accurately identify potentially anomalous or abnormal bot behavior in a new workflow process. The bot evaluation computing platform 110 may process workflow information to identify the plurality of bots by training the machine learning model based on robotic process automation using the monitored workflow data as well as historical workflow data.

At step 227, the bot host server 120, via the monitor bot hub 124, may identify abnormal bot behavior based on the monitoring performed at step 225. Abnormal bot behavior may be based on metadata tracked on a bot's ledger and/or metadata shared with other bots in a bot hub. In that regard, in some instances, other bots in a bot hub may be able to identify another bot exhibiting anomalous or abnormal behavior. In some embodiments, identifying potential anomalous activity by at least one bot may include training a machine learning model to identify potential anomalous activity based on tracking hashchain ledgers of the plurality of bots and expected workflow from received workflow information. In some examples, identifying the potential anomalous activity by at least one bot may include analyzing, by the monitor bot hub, metadata of bots in the plurality of bots. In some examples, identifying the potential anomalous activity by at least one bot may include training a machine learning model based on data related to a completed repair process and identified anomalous activity.

In some embodiments, one or more aspects of the monitored bot activity may differ from parameters considered or determined by the bot evaluation computing platform 110 prior to processing of the current workflow. In some examples, at step 227, the bot evaluation computing platform 110 and/or a monitor bot hub on the bot host server 120 may compare the monitored workflow data to one or more parameters and/or metrics considered or determined by the bot evaluation computing platform 110 prior to processing of the current workflow. For example, at step 227 bot evaluation computing platform 110 may compare expected bot activity based on initially received workflow information with monitored bot activity data while processing a current workflow. In another instance, the bot evaluation computing platform 110 may determine an optimal number of virtual bots and associated bot hubs for processing the current workflow, but for various reasons, the virtual bot host server 120 may instantiate a number of bots different than the determined number of bots, e.g., due to constraints related to other workflow queues being processed, due to a prioritization of a workflow queue relative to other workflow queues, and the like.

At step 228, the bot host server 120, via the monitor bot hub 124, may issue a monitor bot to replace identified bot in its respective bot hub. For examples, identifying a potential anomalous activity by an identified bot at step 227 may cause the monitor bot hub to remove the identified bot to a quarantine hub at step 228 and to execute a repair process on the identified bot in the quarantine hub.

Figure 2H:
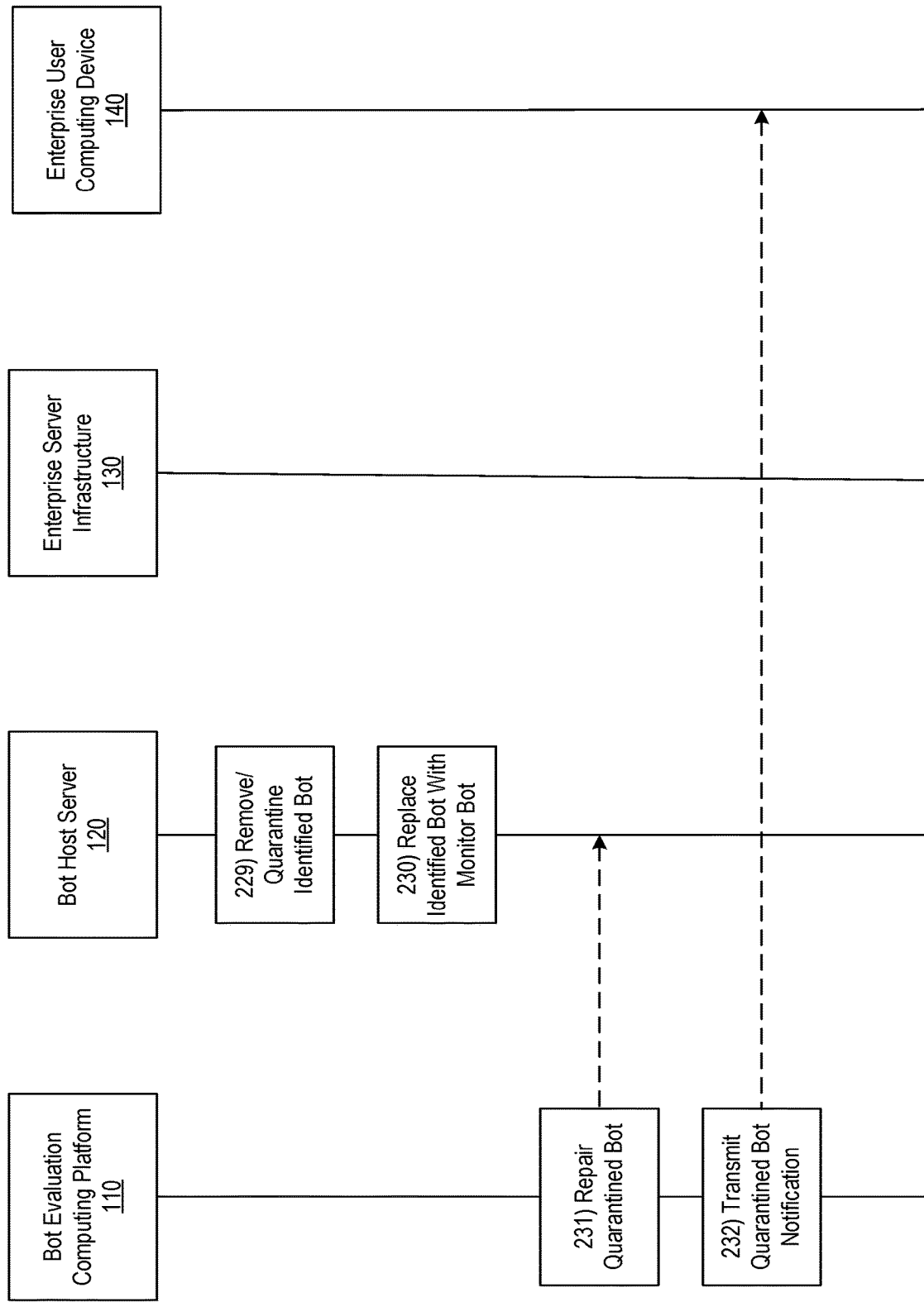

Now referring to FIG. 2H, at step 229, the identified bot may be removed from its respective bot hub and quarantined, e.g., in a quarantine hub. For example, the monitor bot hub 124 may facilitate the identified bot to be repair and to receives a diagnosed level of maliciousness associated with the identified behavior or activity. At step 230, the monitor bot hub 124 may issue a monitor bot therefrom to replace the identified bot in its respective bot hub and to pick up workflow where identified bot left off, e.g., by taking over an incomplete task started by the identified bot without any workflow lag. In some instances, step 230 may include first checking if there is an incomplete workflow execution process assigned to the identified bot and then issuing the replacement bot to resume the incomplete workflow execution process at a step where the identified bot left off prior to being quarantined. In some instances, a replacement bot may be issued from the monitor bot hub 124 to replace the identified bot for the duration that the identified bot remains in the quarantine hub. The replacement bot may resume the workflow assigned to the identified bot at a first workflow point where the identified bot stopped prior to being removed to the quarantine hub.

At step 231, the bot evaluation computing platform 110 and/or the bot host server 120, via the monitor bot hub 124 may repair the quarantined bot, and/or may rectify other network issues potentially related to the identified anomalous activity, such as restarting the server, rerouting memory, assigning more resources to other bots, rectifying machine and/or licenses, and the like. In some examples, executing the repair process may further cause additional network repair processes over a network of the virtual bot host server process. At step 232, the bot evaluation computing platform 110 may transmit a quarantined bot notification to the enterprise user computing device 140 for providing a display related to quarantined bot. In some examples, the notification transmitted at step 232 may indicate that the identified bot has been placed in the quarantine hub for the repair process and may provide a status of the quarantine process.

Figure 4:
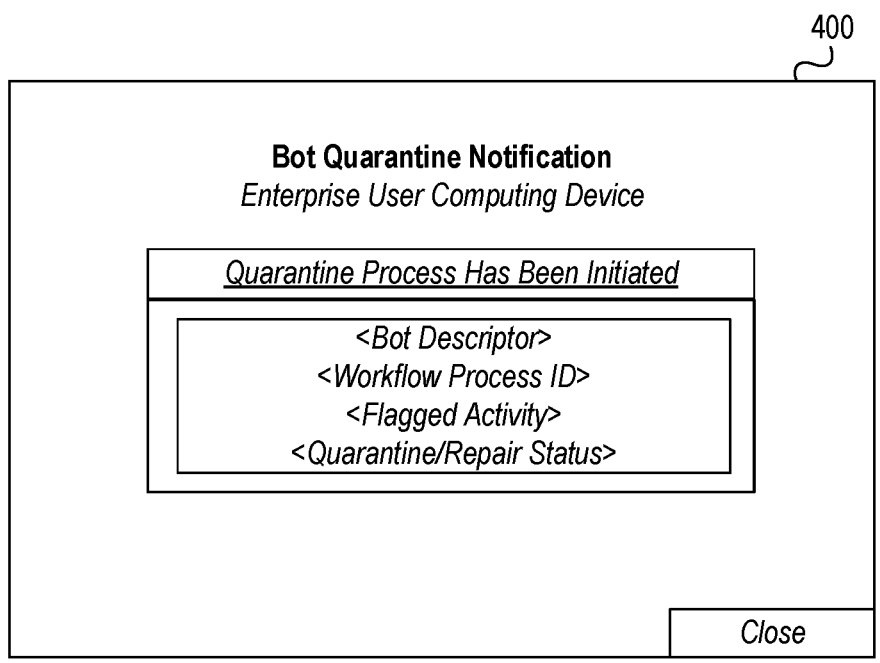

At step 232, the enterprise user computing device 140 may display graphics associated with a notification that one or more bots have been quarantined. In some embodiments, displaying the graphics associated with the quarantined bot or bots may include causing an interface for an enterprise associate at the enterprise center to be displayed on at least one monitoring dashboard user interface presented by an associate computing device. For example, in the one or more enterprise computer systems (e.g., enterprise server infrastructure 130, enterprise user computing device 140) display graphics associated with the results, bot evaluation computing platform 110 may cause the one or more enterprise computer systems (e.g., enterprise server infrastructure 130, enterprise user computing device 140) to display and/or otherwise present one or more graphical user interfaces similar to graphical user interface 400, which is illustrated in FIG. 4. As seen in FIG. 4, graphical user interface 400 may include text and/or other information associated with a "bot quarantine notification" display. The results illustrated in FIG. 4 may, for instance, be sent by bot evaluation computing platform 110 may include a table with a quarantined bot indicators or parameters, e.g., a bot descriptor, workflow process identification, flagged activity type or description, quarantine status, repair status, workflow completion status, and the like. The display provided by graphical user interface 400 may allow an enterprise associate to visualize key metrics and, where applicable, provide one or more inputs as part of further refining the quarantine process and/or identifying anomalous activity with the bot evaluation computing platform 110 and/or while processing workloads by the enterprise system.

Now referring to FIG. 2I, at step 233, the bot evaluation computing platform 110 and/or the bot host server 120, via the monitor bot hub 124, may determine if the identified bot has been repaired. In some instances, the bot evaluation computing platform 110 may query the bot host server 120 to check a status of the quarantined bot at step 233. In some instances, a notification may automatically be transmitted to the bot evaluation computing platform 110 upon completion of the quarantine process. At step 234, if repaired, the bot host server 120, via the monitor bot hub 124, may return the repaired bot to its previous placement in a bot hub and the replacement bot may return to the monitor bot hub 124. In some instances, the monitor bot hub and/or the bot track database 112b of the bot evaluation computing platform 110 may store execution details and workflow information related to the quarantined/repaired bot in a database for training the machine learning model. In some examples, the bot evaluation computing platform 110 may receive an indication that the repair process has successfully repaired the identified bot at step 233, and may then cause transfer of the identified bot to its bot hub position to resume the workflow assigned to the identified bot and transfer the replacement bot back to the monitor bot hub at step 234. At step 235, the identified bot resumes workflow at a current stage in the workflow process, e.g., at a second workflow point where the replacement bot left off. At step 236 if the bot has not successfully been repaired, the bot evaluation computing platform 110 may transmit repair issue notification to the enterprise user computing device 140, which may solicit further input for follow up analysis of the identified bot.

Figure 2J:
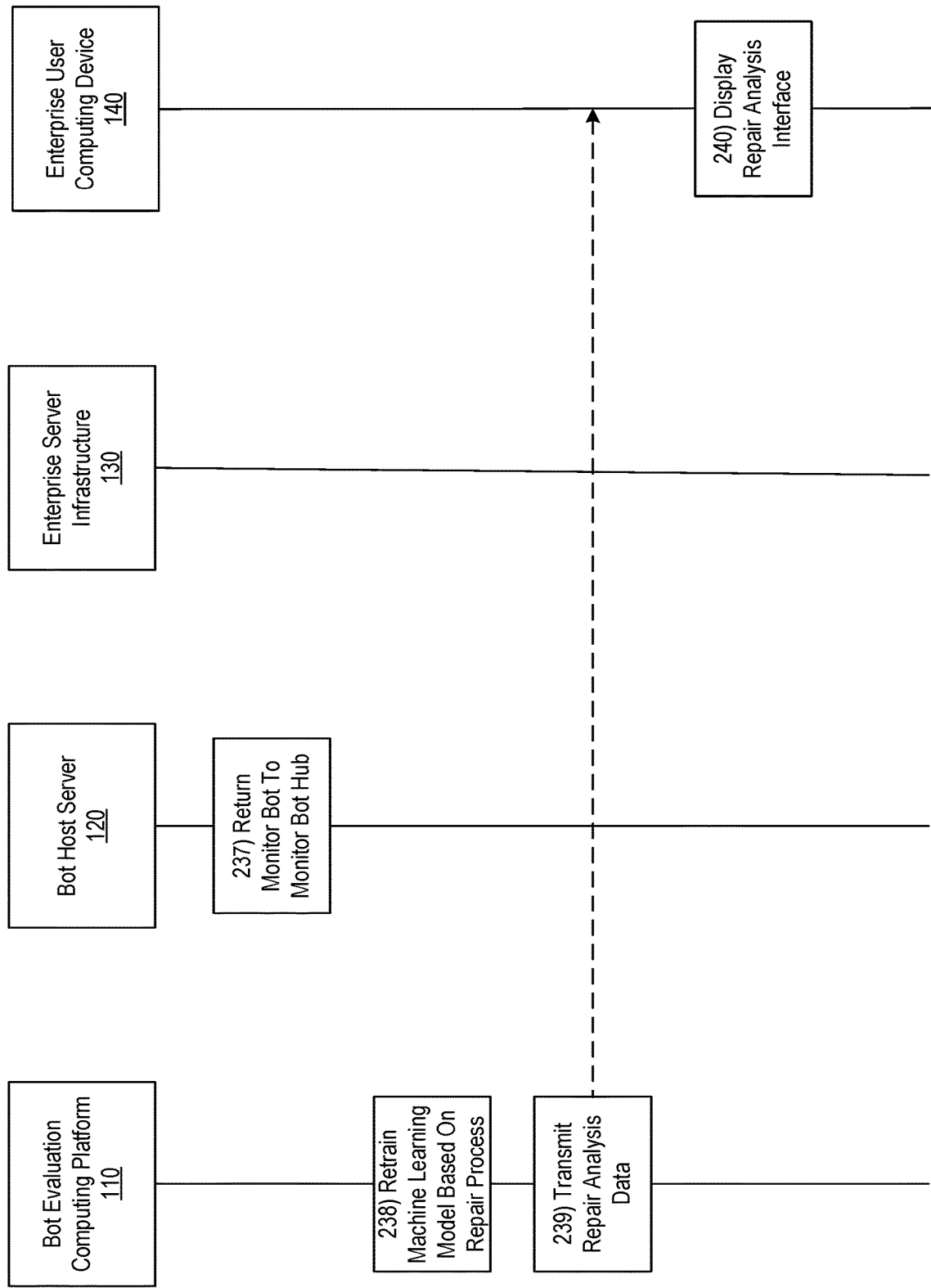

Now referring to FIG. 2J, at step 237, the bot evaluation computing platform 110 and/or the bot host server 120, via the monitor bot hub 124, may return the replacement bot to the monitor bot hub. At step 238, the bot evaluation computing platform 110 may retrain the machine learning model based on information relating to the repair to the identified bot. In that regard, retraining the machine learning model at step 238 may allow the bot evaluation computing platform to more accurately identify anomalous activity and/or a quarantine and repair protocol in a subsequent workflow. In some instances, the bot evaluation computing platform 110 may store, to a repair process database of the bot tracking database 112b, repair execution details relating to the repair process on the identified bot, and train a machine learning model to identify anomalous behavior in a second workflow based on stored repair execution details.

For example, at step 238, bot evaluation computing platform 110 may determine that a difference between a monitored and an expected activity determined by the machine learning model is to be updated based on the difference exceeding a threshold between one or more input or calculated parameters and one or more measured or actual parameters associated with the processing of a current workload. In that regard, the bot evaluation computing platform 110 may compile a set of input or calculated parameters that were part of initial determinations made prior to the processing of a current workflow queue. The bot evaluation computing platform 110 may also compile a set of measure or actual parameters that were part of processing and completing of a current workflow queue. The bot evaluation computing platform 110 may then compare the set of input or calculated parameters with the set of corresponding measured or actual parameters as part of step 238. Based on this comparing, at step 238 the bot evaluation computing platform 110 may determine if the detectable threshold for identifying anomalous activity by the machine learning model is to be updated.

At step 239, the bot evaluation computing platform 110 may transmit a bot repair analysis to the enterprise user computing device 140. Subsequently, at step 240, the enterprise user computing device 140 may display graphics associated with bot repair analysis. In some examples, upon the bot evaluation computing platform 110 receiving an indication that the repair process has successfully repaired the identified bot, at step 240, the bot evaluation computing platform 110 may transmit a notification to the enterprise user computing device 140 providing a repair analysis of the identified bot.

Figure 5:
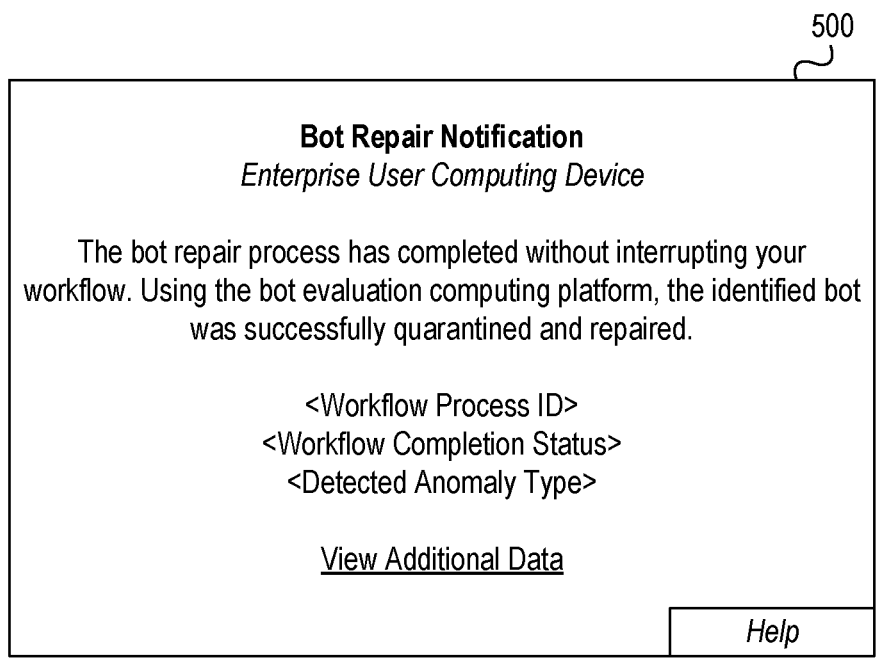

Additionally or alternatively, in providing the display related a bot repair analysis, the bot evaluation computing platform 110 may generate and/or send information to a device linked to an enterprise associate (e.g., enterprise user computing device 140) which may cause enterprise user computing device 140 to generate, display, and/or otherwise present a graphical user interface similar to graphical user interface 500, which is illustrated in FIG. 5. As seen in FIG. 5, graphical user interface 500 may include text and/or other information indicating that a bot repair process has been performed (e.g., "The bot repair process has completed without interrupting your workflow. Using the bot evaluation computing platform, the identified bot was successfully quarantined and repaired."), providing the workflow information and information related to the workflow process, the identified abnormality/anomaly, and/or the quarantine and repair process (e.g., workflow process identification, workflow completion status, detected anomaly type, number of bot impacted, bot identifiers of the impact bot(s), timing to complete the workflow queue, resources used to complete the workflow queue, and the like), as well as one or more user-selectable controls allowing the user of enterprise user computing device 140 to view the additional data relating to the machine leaning model calculations and associated parameters (e.g., "View Additional Data").

Subsequently, the bot evaluation computing platform 110 may repeat one or more steps of the example event sequence discussed above in training and using machine-learning models to arrangement a plurality of bots, assign and track hashchain for each of the plurality of bots, and monitor, evaluate, quarantine, and repair bots identified with anomalous activity using a monitor bot hub. Additionally or alternatively, bot evaluation computing platform 110 may initiate one or more workflow analysis processes and/or generate and send one or more data results interfaces, similar to how bot evaluation computing platform 110 may initiate such processes and generate and send such interfaces in the examples described above.

Figure 6:
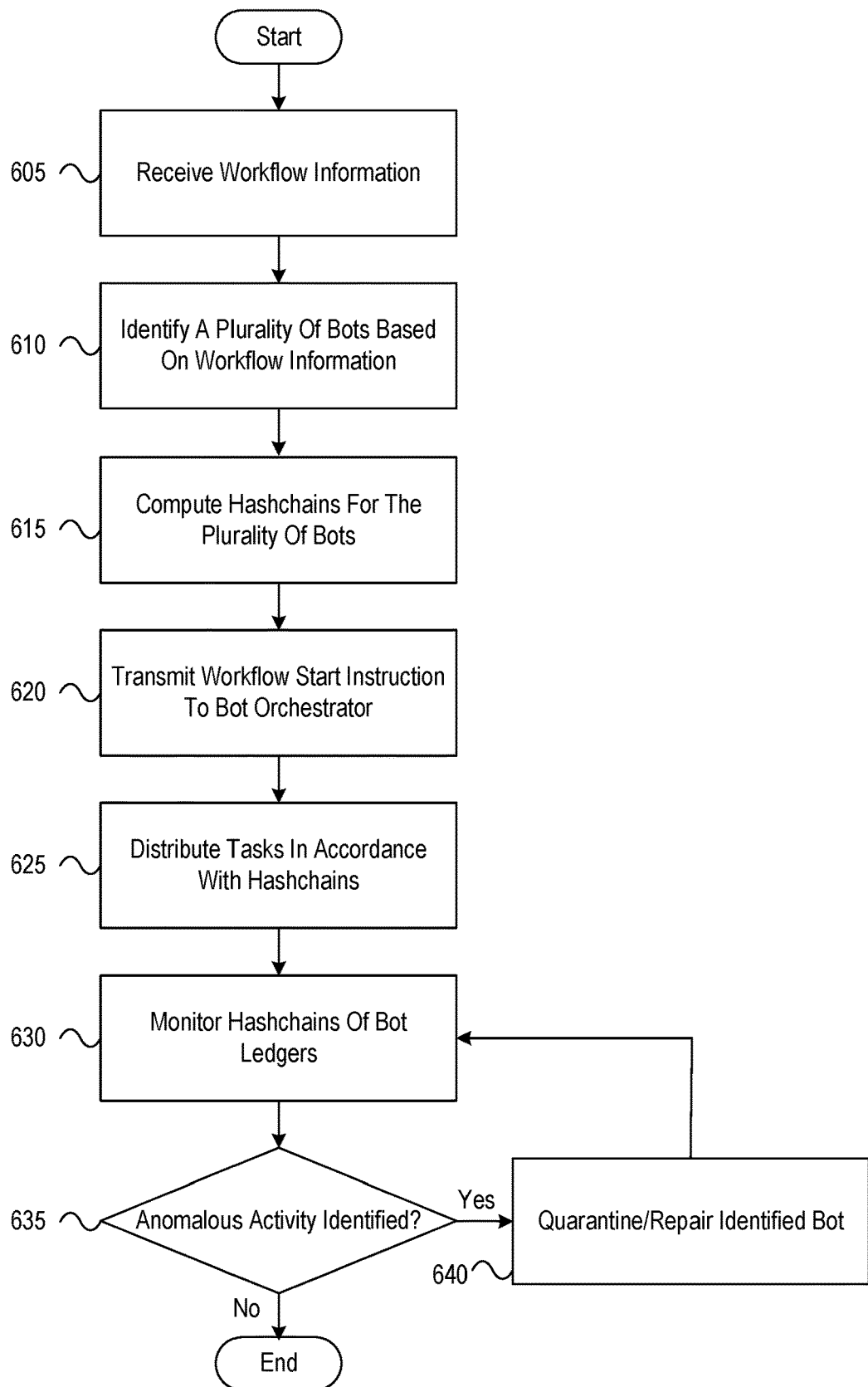
FIG. 6 depicts an illustrative method for monitoring virtual bots using hashchain ledgers and identifying potentially suspicious activity based on identified variations in the hashchain ledgers in accordance with one or more example embodiments.

FIG. 6 depicts an illustrative method for monitoring virtual bots using hashchain ledgers and identifying potentially suspicious activity based on identified variations in the hashchain ledgers in accordance with one or more example embodiments. Referring to FIG. 6, at step 605, a computing platform having at least one processor, a communication interface, and memory may receive, via the communication interface and from one or more enterprise data source computer systems, workflow information associated with performing a first workflow that includes executing one or more tasks using a plurality of virtual bots. The workflow information may be received at step 605 upon receiving an input to begin of a first workflow queue. In some arrangements, the workflow information may include enterprise workflow security policy information. At step 610, the computing platform may identify a plurality of bots associated with processing the first workflow, e.g., by training a machine learning model based on one or more computing metrics associated with completion of the first workflow.

At step 615, the computing platform may compute, using a hash function, a hashchain for each identified bot of the plurality of bots. The hashchain computed at step 615 may include a trackable code specific to an associated bot. Computing hashchains at step 615 may include assigning an identification code for the associated bot and a task code associated with at least one task to be executed by the associated bot. In some examples, computing hashchains at step 615 may include determining a relative permanence of a task of the one or more tasks of the first workflow and attributing a portion of the hashchain based on the relative permanence of the task. At step 620, the computing platform may transmit a workflow start instruction to a bot orchestrator on a virtual bot server. The workflow start instruction may cause the bot orchestrator to instantiate the plurality of bots to process the one or more tasks of the first workflow. Upon receiving the workflow start instruction, at step 625, the virtual bot server may distribute one or more tasks of the of the first workflow to the plurality of bots in accordance with associated hashchains of each of the plurality of bots.

At step 630, the computing platform may monitor the plurality of bots performing the one or more tasks of the first workflow. Monitoring the plurality of bots may include verifying tasks of identified bots based on analyzing hashchains of bots performing tasks of the first workflow to identify a potential anomalous activity by at least one bot. In some examples, monitoring the plurality of bots may include analyzing a ledger associated with a respective bot of each of the plurality of bots. The ledger may include metadata of the respective bot and of other bots performing a common task of the first workflow.

Based on the monitoring of hashchains, at step 635 the computing platform may determine if anomalous activity is detected. If anomalous activity has been identified, at step 640, the computing platform may quarantine and repair the bot or bots associated with the anomalous activity and subsequently return to step 630 to continue monitoring hashchains, e.g., until the first workflow has been completed. Transmitting the results at step 630 may include causing the enterprise computing device to display one or more graphical user interfaces associated with the results on the enterprise computing device. If no anomalous activity is identified at step 635, the process may end, e.g., upon bots completing the one or more tasks of the first workflow.

Figure 7:
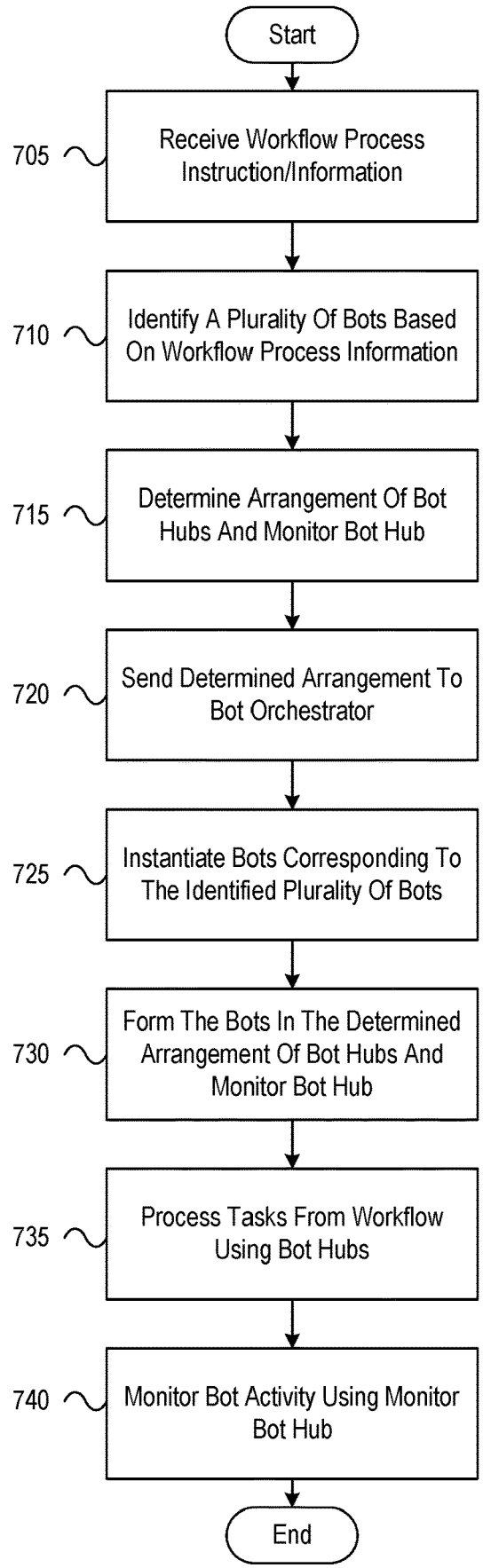
FIG. 7 depicts an illustrative method for forming a bot hub architecture that includes a plurality of enterprise bot hubs and a monitoring bot hub that monitors the enterprise bot hubs and initiates a repair process upon identifying a virtual bot exhibiting potentially abnormal behavior in accordance with one or more example embodiments.

FIG. 7 depicts an illustrative method for forming a bot hub architecture that includes a plurality of enterprise bot hubs and a monitoring bot hub that monitors the enterprise bot hubs and initiates a repair process upon identifying bot exhibiting potentially abnormal behavior in accordance with one or more example embodiments. Referring to FIG. 7, at step 705, a computing platform having at least one processor, a communication interface, and memory may receive, via the communication interface and from one or more enterprise data source computer systems, a workflow process instruction from an enterprise computing device. The workflow process instruction received at step 705 may include workflow information associated with performing a first workflow process by executing one or more tasks using a plurality of virtual bots. At step 710, the computing platform may identify a plurality of bots associated with performing the first workflow process, e.g., using models based on one or more computing metrics associated with completion of the first workflow process, to one or more metrics used in calculating a number of bots used to complete a given task.

At step 715, the computing platform may determine, using a machine learning model, an arrangement of bot hubs to execute one or more tasks of the first workflow process, e.g., based on computing metrics associated with completion of tasks in the first workflow process and/or based on aligning bots with common tasks. Each bot hub may include at least one bot and bots within a common bot hub may share metadata while executing one or more tasks of the first workflow process, determining the arrangement of bot hubs may include arranging a monitor bot hub that includes a closed network of monitor bots configured to observe other bot hubs and to store metadata associated with observing other bot hubs. Determining the arrangement of bot hubs may at step 715 include matching workflow keys of bots in the plurality of bots to form an associated bot hub. In some examples, determining the arrangement of bot hubs at step 715 may include computing, using a hash function, a hashchain for each identified bot of the plurality of bots, and determining a subset of bots for an associated bot hub by matching components of hashchains associated with one or more tasks of the first workflow. The hashchain may include a trackable code specific to an associated bot and associated with one or more tasks of the first workflow. Determining the arrangement of bot hubs at step 715 may include aligning one or more bots of the plurality of bots based on common tasks of the first workflow. Determining the arrangement at step 715 may include using a machine learning model based on one or more computing metrics associated with completion of the first workflow and one or more computing metrics from historical workflow data.

At step 720, the computing platform may then send the determined arrangement of bot hubs to a bot orchestrator on a virtual bot host server. Sending the determined arrangement of bot hubs to the bot orchestrator causes the bot orchestrator to instantiate at least one bot corresponding to the determined number of bots at step 725. At step 730, the bot orchestrator of the virtual bot host server may form the at least one bot in the determined arrangement of bot hubs. At step 735, the bots hosted on the virtual bot server may then process tasks from the first workflow using the at least one bot. At step 740, the computing platform may monitor bot activity of the bot hubs via the monitor bot hub. Monitoring bot activity at step 740 may include, upon observing that an identified bot in a first bot hub exhibits abnormal behavior, removing the identified bot to a quarantine hub, and executing a repair process on the identified bot in the quarantine hub. In some examples, a monitor bot from the monitor bot hub may be issued to replace the identified bot in the first bot hub while the identified bot remains in the quarantine hub.

Figure 8:
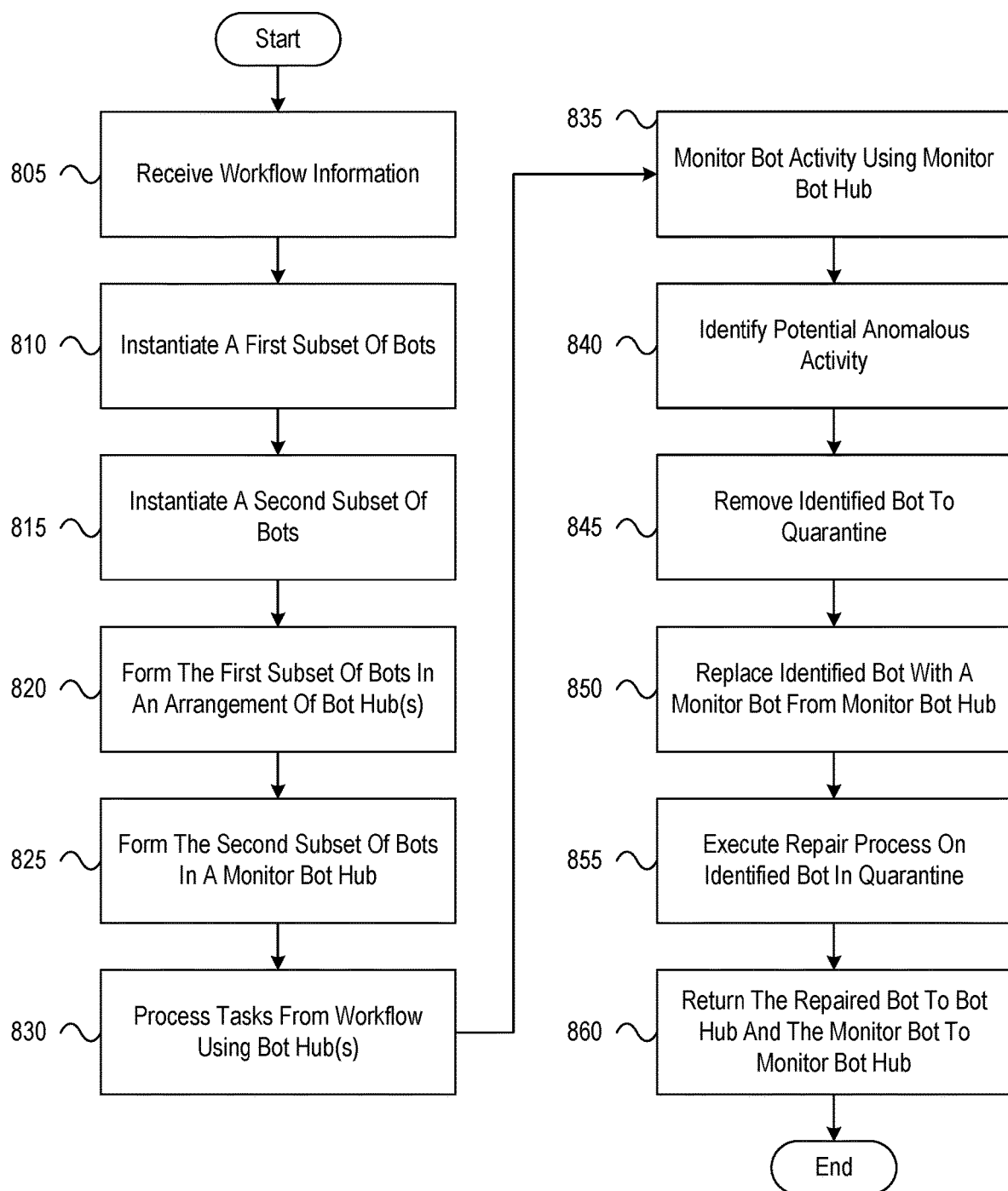
FIG. 8 depicts an illustrative method for identifying, quarantining, and repairing a virtual bot exhibiting potentially abnormal activity bot, and issuing a replacement bot to fill in for the quarantined bot during a quarantine interval in accordance with one or more example embodiments.

FIG. 8 depicts an illustrative method for identifying, quarantining, and repairing a virtual bot exhibiting potentially abnormal activity bot, and issuing a replacement bot to fill in for the quarantined bot during a quarantine interval in accordance with one or more example embodiments. Referring to FIG. 8, at step 805, a computing platform having at least one processor, a communication interface, and memory may receive, via the communication interface and from one or more enterprise data source computer systems, workflow information associated with performing a first workflow process by executing one or more tasks using a plurality of virtual bots. At step 810, the computing platform may transmit a workflow start instruction to a bot orchestrator on a virtual bot host server to cause the bot orchestrator to instantiate a first subset of bots of the plurality of bots to process the one or more tasks of the first workflow.

At step 815, the computing platform may transmit a monitor instruction to a bot orchestrator on a virtual bot host server to cause the bot orchestrator to instantiate a second subset of bots of the plurality of bots to form a monitor bot hub. Subsequently, at step 820, the virtual bot host server may form the first subset of bots in an arrangement of one or more bot hubs and, at step 825, the virtual bot host server may form the second subset of bots in a monitor bot hub. The monitor bot hub may be configured to monitor the first subset of bots performing the one or more tasks of the first workflow, identify a potential anomalous activity by at least one bot in the first subset of bots, remove the identified bot to a quarantine hub, and execute a repair process on the identified bot in the quarantine hub.

At step 830, tasks from the first workflow are processed using the one or more bot hubs. At step 835, the monitor bot hub may monitor bot activity and, at step 840, the computing platform may identify potential anomalous activity. Identifying potential anomalous activity by at least one bot at step 840 may include training, by the at least one processor, a machine learning model to identify potential anomalous activity based on tracking hashchain ledgers of the plurality of bots and expected workflow from received workflow information. Identifying potential anomalous activity by at least one bot at step 840 may include analyzing, by the monitor bot hub, metadata of bots in the plurality of bots. In some examples, identifying potential anomalous activity by at least one bot at step 840 may include training, by the at least one processor, a machine learning model based on data related to a completed repair process and identified anomalous activity.

At step 845, the computing platform may remove an identified bot to quarantine. At step 850, the computing platform may issue a replacement bot from the monitor bot hub to replace the identified bot while the identified bot remains in the quarantine hub. The replacement bot may resume the workflow assigned to the identified bot at a first workflow point where the identified bot stopped prior to being removed to the quarantine hub. At step 855, the computing platform may execute a repair process on the identified bot in quarantine. In some examples, step 855 may include the computing platform receiving an indication that the repair process has successfully repaired the identified bot. At step 860, the computing platform may transfer the identified bot to a bot hub position to resume the workflow assigned to the identified bot at a second workflow point where the replacement bot left off, and the replacement bot may be transferred back to the monitor bot hub.

Devices, systems, and methods, as described herein, relate to workload assessment and configuration for executable applications on an enterprise computing system environment. An entity (e.g., a computing device, a private computing network, an enterprise organization, a multi-platform computing network, etc.) may be associated with an executable application deployed for execution and access by users via a computing system environment, for example, including one or more enterprise computing system environments. The computing system environment may include one or more of a web server, an application server, a database server, an encryption device, a storage device, or a file server.

The system may perform executable applications based on virtual bots that complete various workloads resulting in, for example, increased processing speeds, greater throughput, ability to handle more simultaneous users or user requests, and/or straightforward scalability as the number of users increases or decreases. The scalability benefits may include meeting dynamically changing computing capabilities requirements without requiring dedicated resources to meet the maximum peak performance requirements at all times, although the maximum peak performance may only be infrequently required. Although code for the executable application may have been modified to target a particular computing system environment and/or recompiled with libraries targeted toward a computing system environment, these modifications may not capture or reflect all of the operational and/or environment differences of a computing system environment.

Arrangements discussed herein may address the aforementioned issues by customizing bots in accordance with application and/or computing system configuration parameters based on monitoring performance of the workflow processes in the computing system environment in relation to one or more configuration settings for the workflow processes and/or the computing system environment. The aforementioned issues may be addressed by customizing workflow and/or computing system parameters based on monitoring performance of the workflow processes in the second computing system environment in relation to one or more configuration settings for the workflow processes and/or the computing system environment. The customized workflow and/or computing system configuration parameters may be based on information from previous workflow processes executed on the computing system environment. The customized workflow and/or computing system configuration parameters may include determining optimal configuration parameter values and/or ranges of preferred and/or acceptable configuration parameters. Computational optimization, for example, multidimensional optimization, polynomial optimization, artificial intelligence, and/or machine learning techniques may be used to determine configuration setting values and/or value ranges based on designated target performance metrics, based on the monitored performance of executing a workflow in the computing system environment, based on information from historical workflow processes executed on the computing system environment, and/or based on the monitored performance of the workflow processes executed on the computing system environment.

Ongoing adjustments to configuration setting values may be determined based on ongoing monitoring of performance metrics of the workflow executions and/or the computing system environment. The monitoring may be in relation to one or more configuration settings for the workflow executions and/or the computing system environment. The ongoing adjustments to configuration setting values may also be based on information from previous workflow executions on the computing system environment. The ongoing adjustments to configuration setting values may include determining optimal configuration parameter values and/or ranges of preferred and/or acceptable workflow and/or computing system configuration parameters. The ongoing adjustments to configuration setting values may include determining interdependencies of the various configuration parameters and settings. Multidimensional optimization, polynomial optimization, artificial intelligence, and/or machine learning techniques may be used to determine best configuration setting values and/or value ranges based on designated target performance metrics, based on interdependencies of the configuration parameters and settings, and/or based on the monitored performance of the workload executions and/or the computing system environment.

Ongoing monitoring and evaluation of the workflow executions and/or the computing system environment may comprise monitoring, logging, and/or analyzing real-time/runtime configuration parameter settings, values, and/or real-time/runtime performance metrics. Logged real-time/runtime data may be validated against defined policies and/or templates. Deviations from acceptable values and ranges may be flagged to notify an administrative function of the deviations, initiate an analysis, and/or initiate a determination of one or more corrective actions that may be taken to bring the performance metrics back into conformance with the policies and/or templates.

Policies and templates may comprise: standard definitions of configuration parameters and/or performance metrics; ideal, upper, and/or lower bound values for the configuration parameters and/or performance metrics; and/or one or more standard combinations of settings and values for the configuration parameters and/or performance metrics upon which operation of the executable application may be based.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface and from an enterprise computing device, workflow information associated with performing a first workflow process by executing one or more tasks using a plurality of bots;
   transmit a workflow start instruction to a bot orchestrator on a virtual bot host server, wherein transmitting the first workflow process start instruction to the bot orchestrator causes the bot orchestrator to instantiate a first subset of the plurality of bots to process the one or more tasks of the first workflow process;
   transmit a monitor instruction to the bot orchestrator on the virtual bot host server, wherein transmitting the monitor instruction to the bot orchestrator causes the bot orchestrator to instantiate a second subset of the plurality of bots to form a monitor bot hub that monitors the first subset of bots performing the one or more tasks of the first workflow process to identify a potential anomalous activity by at least one bot,
   wherein identifying a potential anomalous activity by an identified bot causes the monitor bot hub to:
   remove the identified bot to a quarantine hub; and
   execute a repair process on the identified bot in the quarantine hub.

2. The computing platform of claim 1, wherein the memory further stores computer-readable instructions that, when executed by the at least one processor, cause the computing platform to:
   issue a replacement bot from the monitor bot hub to replace the identified bot while the identified bot remains in the quarantine hub, wherein the replacement bot resumes the first workflow process assigned to the identified bot at a first workflow point where the identified bot stopped prior to being removed to the quarantine hub.

3. The computing platform of claim 2, wherein the memory further stores computer-readable instructions that, when executed by the at least one processor, cause the computing platform to:
   receive an indication that the repair process has successfully repaired the identified bot;
   transfer the identified bot to a bot hub position to resume the first workflow process assigned to the identified bot at a second workflow point where the replacement bot left off; and
   transfer the replacement bot back to the monitor bot hub.

4. The computing platform of claim 1, wherein the memory further stores computer-readable instructions that, when executed by the at least one processor, cause the computing platform to:
   store, to a repair process database, repair execution details relating to the repair process on the identified bot; and
   train a machine learning model to identify anomalous behavior in a second workflow based on stored repair execution details.

5. The computing platform of claim 1, wherein the memory further stores computer-readable instructions that, when executed by the at least one processor, cause the computing platform to:
   transmit, to the enterprise computing device, a notification indicating that the identified bot has been placed in the quarantine hub for the repair process.

6. The computing platform of claim 1, executing the repair process further cause additional network repair processes over a network of the virtual bot host server.

7. The computing platform of claim 1, wherein instantiating the first subset of bots to process the one or more tasks of the first workflow process includes arranging the first subset of bots in one or more bot hubs by aligning one or more bots based common tasks of the first workflow process.

8. The computing platform of claim 1, wherein transmitting the workflow start instruction to the bot orchestrator includes computing, using a hash function, a hashchain for each identified bot of the first subset of bots, wherein the hashchain includes a trackable code specific to an associated bot and associated with one or more tasks of the first workflow process; and
   wherein identifying the potential anomalous activity by at least one bot includes monitoring hashchain ledgers of each of the first subset of bots.

9. The computing platform of claim 1, wherein identifying the potential anomalous activity by at least one bot includes training, by the at least one processor, a machine learning model to identify potential anomalous activity based on tracking hashchain ledgers of the plurality of bots and expected workflow from received workflow information.

10. The computing platform of claim 1, wherein identifying the potential anomalous activity by at least one bot includes analyzing, by the monitor bot hub, metadata of bots in the plurality of bots.

11. The computing platform of claim 1, wherein identifying the potential anomalous activity by at least one bot includes training, by the at least one processor, a machine learning model based on data related to a completed repair process and identified anomalous activity.

12. The computing platform of claim 1, wherein the memory further stores computer-readable instructions that, when executed by the at least one processor, cause the computing platform to:
   receive an indication that the repair process has successfully repaired the identified bot; and
   transmit a notification to an enterprise user device providing a repair analysis of the identified bot.

13. A method, comprising:
   at a computing platform comprising at least one processor, a communication interface, and memory:
   receiving, via the communication interface and from an enterprise computing device, workflow information associated with performing a first workflow process by executing one or more tasks using a plurality of bots;

transmitting a workflow start instruction to a bot orchestrator on a virtual bot host server, wherein transmitting the first workflow process start instruction to the bot orchestrator causes the bot orchestrator to instantiate a first subset of bots of the plurality of bots to process the one or more tasks of the first workflow process; and transmitting a monitor instruction to a bot orchestrator on a virtual bot host server, wherein transmitting the monitor instruction to the bot orchestrator causes the bot orchestrator to instantiate a second subset of bots of the plurality of bots to form a monitor bot hub configured to:
- monitor the first subset of bots performing the one or more tasks of the first workflow process;
- identify a potential anomalous activity by an identified bot in the first subset of bots;
- remove the identified bot to a quarantine hub; and
- execute a repair process on the identified bot in the quarantine hub.

14. The method of claim 13, further comprising:
issuing a replacement bot from the monitor bot hub to replace the identified bot while the identified bot remains in the quarantine hub, wherein the replacement bot resumes the first workflow process assigned to the identified bot at a first workflow point where the identified bot stopped prior to being removed to the quarantine hub.

15. The method of claim 14, further comprising:
receiving an indication that the repair process has successfully repaired the identified bot;
transferring the identified bot to a bot hub position to resume the first workflow process assigned to the identified bot at a second workflow point where the replacement bot left off; and
transferring the replacement bot back to the monitor bot hub.

16. The method of claim 13, wherein identifying the potential anomalous activity by at least one bot includes training, by the at least one processor, a machine learning model to identify potential anomalous activity based on tracking hashchain ledgers of the plurality of bots and expected workflow from received workflow information.

17. The method of claim 13, wherein identifying the potential anomalous activity by at least one bot includes analyzing, by the monitor bot hub, metadata of bots in the plurality of bots.

18. The method of claim 13, further comprising:
receiving an indication that the repair process has successfully repaired the identified bot; and
transmitting a notification to an enterprise user device providing a repair analysis of the identified bot.

19. The method of claim 13, wherein identifying the potential anomalous activity by at least one bot includes training, by the at least one processor, a machine learning model based on data related to a completed repair process and identified anomalous activity.

20. One or more non-transitory computer-readable media storing instructions that, when executed by a computing platform comprising at least one processor, a communication interface, and memory, cause the computing platform to:

receive, via the communication interface and from an enterprise computing device, workflow information associated with performing a first workflow process by executing one or more tasks using a plurality of bots;

determine, using a machine learning model, a first subset of the plurality of bots to process the one or more tasks of the first workflow process and a second subset of the plurality of bots to monitor the first subset of bots performing the one or more tasks of the first workflow process;

transmit a workflow start instruction to a bot orchestrator on a virtual bot host server, wherein transmitting the first workflow process start instruction to the bot orchestrator causes the bot orchestrator to instantiate the first subset of bots to process the one or more tasks of the first workflow process; and transmit a monitor instruction to the bot orchestrator on the virtual bot host server, wherein transmitting the monitor instruction to the bot orchestrator causes the bot orchestrator to instantiate the second subset of bots to form a monitor bot hub configured to:
- monitor the first subset of bots performing the one or more tasks of the first workflow process;
- based on the monitoring, identify a potential anomalous activity by an identified bot;
- remove the identified bot to a quarantine hub; and
- execute a repair process on the identified bot in the quarantine hub.

* * * * *